(12) United States Patent
Hawley et al.

(10) Patent No.: US 11,989,625 B2
(45) Date of Patent: May 21, 2024

(54) METHOD AND SYSTEM FOR DETECTING AND AVOIDING LOSS OF SEPARATION BETWEEN VEHICLES AND UPDATING THE SAME

(71) Applicant: Honeywell International Inc., Morris Plains, NJ (US)

(72) Inventors: Megan Hawley, Roseville, MN (US); Raj Mohan Bharadwaj, Maple Grove, MN (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 1264 days.

(21) Appl. No.: 16/370,141

(22) Filed: Mar. 29, 2019

(65) Prior Publication Data
US 2020/0311602 A1 Oct. 1, 2020

(51) Int. Cl.
*G06Q 30/00* (2023.01)
*G06N 20/00* (2019.01)
*G08G 5/00* (2006.01)

(52) U.S. Cl.
CPC .......... *G06N 20/00* (2019.01); *G08G 5/0095* (2013.01)

(58) Field of Classification Search
CPC ............................. G06N 20/00; G08G 5/0095
See application file for complete search history.

(56) References Cited

U.S. PATENT DOCUMENTS

| | | |
|---|---|---|
| 8,775,341 B1 | 7/2014 | Commons |
| 9,977,430 B2 | 5/2018 | Shalev-Shwartz |
| 10,185,327 B1 * | 1/2019 | Konrardy ................ G06F 30/15 |
| 11,004,000 B1 * | 5/2021 | Gutmann .......... B60W 30/0956 |

(Continued)

FOREIGN PATENT DOCUMENTS

WO 2018083352 A1 5/2018

OTHER PUBLICATIONS

European Search Report dated Aug. 18, 2020 in counterpart European Patent Application No. 20153961.6 (8 pages, in English).

(Continued)

*Primary Examiner* — Alvin L Brown
(74) *Attorney, Agent, or Firm* — Lorenz & Kopf LLP

(57) ABSTRACT

Disclosed are methods, systems, and non-transitory computer-readable mediums for detecting and avoiding loss of separation between vehicles. A first method may include training a vehicle interaction machine learning model to predict future vehicle interactions based on identified vehicle interactions and an identified risk of encounter between two or more selected vehicles. A second method may include obtaining real-time data associated with a vehicle-of-interest; evaluating the real-time data associated with the vehicle-of-interest to form encounter models; monitoring the encounter models with a model access function of the vehicle interaction machine learning model to detect real-time anomalies; and in response to detecting a real-time anomaly, transmitting an alert. A third method may include obtaining trajectory information; analyzing the trajectory information to determine whether a trajectory is a new trajectory type or whether the trajectory is a member of a new interaction; updating training data for the vehicle interaction machine learning model.

20 Claims, 12 Drawing Sheets

(56) References Cited

U.S. PATENT DOCUMENTS

2020/0356951 A1* 11/2020 Cristache ............... G06Q 10/10
2021/0231447 A1* 7/2021 Ahmed .............. G01C 21/3446

OTHER PUBLICATIONS

Bastani, Vahid et al: "Unsupervised trajectory pattern classification using hierarchical Dirichlet Process Mixture hidden Markov model", 2814 IEEE International Workshop on Machine Learning for Signal Processing (MLSP), IEEE, Sep. 2, 21814 (2814-89-21), pp. 1-6, XP8326S5482.
Valenzuela, A. et al: "Conflict resolution 1-18 in converging air traffic using trajectory patterns", Journal of Guidance and Control and Dynamics, AIAA, Reston, VA, US, vol. 34, No. 4, Jul. 1, 2011 (2011-87-01), pp. 1172-11S9, XPBOS15S39S.

* cited by examiner

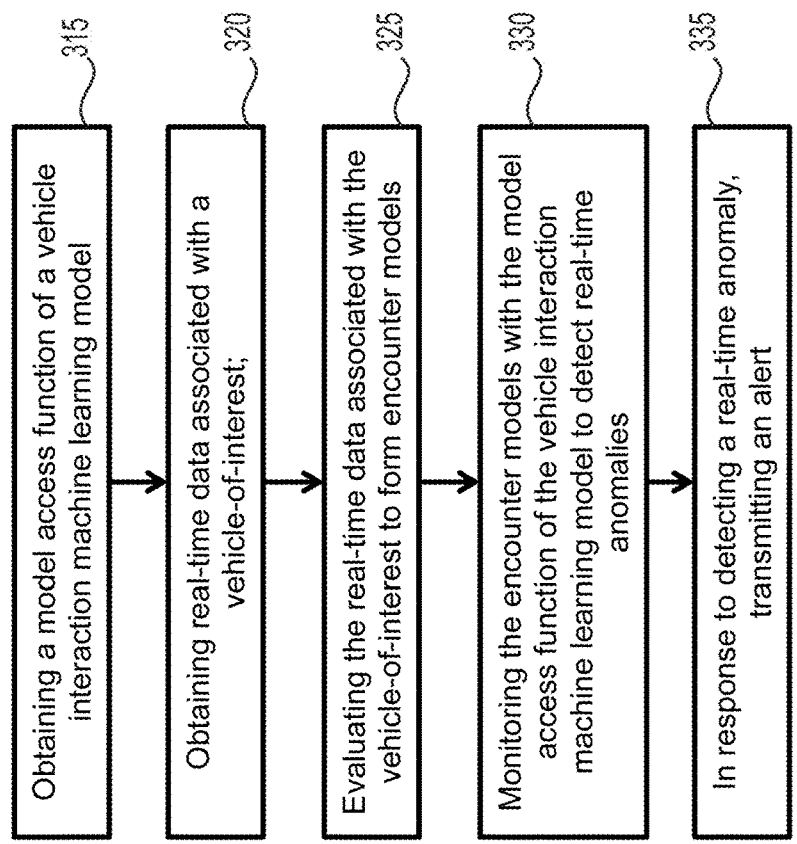
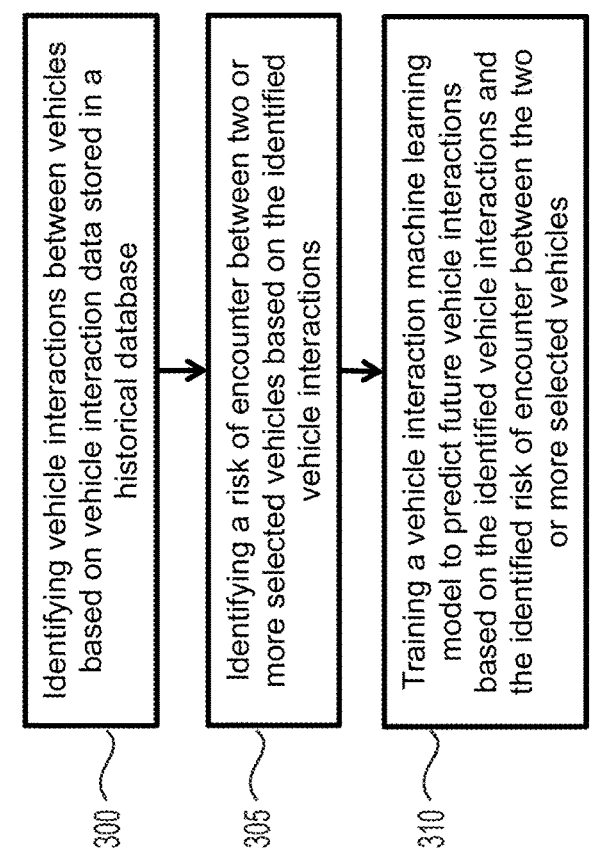
FIG. 3B
FIG. 3A

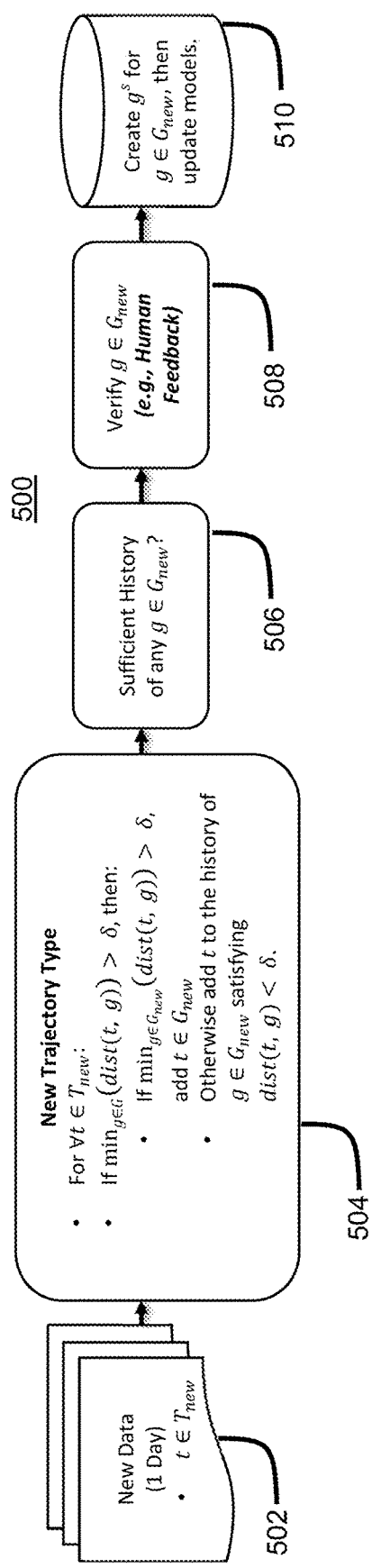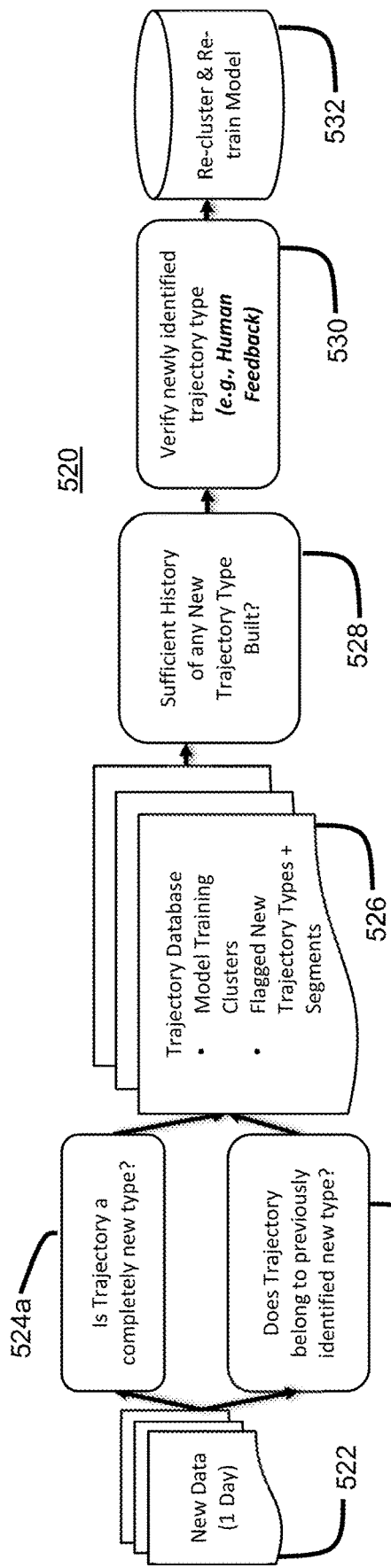
FIG. 5A
FIG. 5B

METHOD AND SYSTEM FOR DETECTING AND AVOIDING LOSS OF SEPARATION BETWEEN VEHICLES AND UPDATING THE SAME

STATEMENT REGARDING FEDERALLY SPONSORED RESEARCH OR DEVELOPMENT

The invention described herein was made in the performance of work under NASA Contract NNA16BF04C and is subject to the provisions of section 20135 of the National Aeronautics and Space Act (51 U.S.C. § 20135).

CROSS-REFERENCE TO RELATED APPLICATIONS

This application is related to co-pending U.S. patent application Ser. No. 16/370,470 entitled "METHODS AND SYSTEMS FOR DETECTING AND AVOIDING LOSS OF SEPARATION BETWEEN VEHICLES", which was filed on Mar. 29, 2019 and incorporated by reference in its entirety.

TECHNICAL FIELD

Various embodiments of the present disclosure relate generally to managing spacing between vehicles and, more particularly, to methods and systems for detecting and avoiding loss of separation between vehicles and to methods and systems for updating the same.

BACKGROUND

The volume of both manned and unmanned air traffic in the National Airspace (NAS) is projected to increase substantially over the coming decades. As a consequence, workloads of Air Traffic Control (ATC) may increase, airspace congestion may increase, and a risk of mid-air collisions may increase. Current ATC traffic management practices are human intensive. Aircraft separation (i.e., the distance between aircraft) is managed by ATC through open-loop vectoring, and monitored on-board an aircraft through collision avoidance systems, such as the Traffic Collision Avoidance System (TCAS). TCAS utilizes secondary surveillance radar (SSR) transponder signals onboard an aircraft. TCAS monitors the airspace around an aircraft for other aircraft equipped with a corresponding active transponder, independent of ATC, and warns pilots of the presence of other transponder-equipped aircraft which may prevent a threat of mid-air collision.

While ATC operations and TCAS aid in avoiding loss of separation, there remains a need for systems that assess and give system-wide advanced warning for possible loss of separation. This need will only grow as the amount of traffic in the NAS increases, for instance due to interactions between manned and unmanned flights. Loss of separation implies two aircraft are at risk of approaching each other and/or are coming within a minimum threshold distance such that a collision may occur.

Similarly, vehicle congestion and risk of vehicle collision during vehicle operations is present for many vehicle systems, such as automobiles, trains, and ships. For instance, ships entering or leaving busy ports or in busy shipping lanes need to avoid collisions. Likewise, automobiles also have a risk of collision during vehicle operations due to inattentive operators and/or weather. Furthermore, for vehicles in general, there are trends toward increased vehicle autonomy and automation, such as in self-driving automobiles or aircraft. Therefore, control systems of autonomous vehicles need systems and methods to avoid collisions.

The present disclosure is directed to overcoming one or more of these above-referenced challenges.

SUMMARY OF THE DISCLOSURE

According to certain aspects of the disclosure, systems and methods are disclosed for detecting and avoiding loss of separation between vehicles.

For instance, one method for detecting and avoiding loss of separation between vehicles may include obtaining a model access function of a vehicle interaction machine learning model; obtaining real-time data associated with a vehicle-of-interest; evaluating the real-time data associated with the vehicle-of-interest to form encounter models; monitoring the encounter models with the model access function of the vehicle interaction machine learning model to detect real-time anomalies; and in response to detecting a real-time anomaly, transmitting an alert. Creating the vehicle interaction machine learning model by: identifying vehicle interactions between vehicles based on vehicle interaction data stored in a historical database; identifying a risk of encounter between two or more selected vehicles based on the identified vehicle interactions; and training the vehicle interaction machine learning model to predict future vehicle interactions based on the identified vehicle interactions and the identified risk of encounter between the two or more selected vehicles.

Further, the system for detecting and avoiding loss of separation between vehicles may include memory storing instructions; and a processor executing the instructions to perform a process. The process may include obtaining a model access function of a vehicle interaction machine learning model; obtaining real-time data associated with a vehicle-of-interest; evaluating the real-time data associated with the vehicle-of-interest to form encounter models; monitoring the encounter models with the model access function of the vehicle interaction machine learning model to detect real-time anomalies; and in response to detecting a real-time anomaly, transmitting an alert. Creating the vehicle interaction machine learning model by: identifying vehicle interactions between vehicles based on vehicle interaction data stored in a historical database; identifying a risk of encounter between two or more selected vehicles based on the identified vehicle interactions; and training the vehicle interaction machine learning model to predict future vehicle interactions based on the identified vehicle interactions and the identified risk of encounter between the two or more selected vehicles.

Further, a non-transitory computer-readable medium may store instructions that, when executed by a processor, cause the processor to perform a method for detecting and avoiding loss of separation between vehicles. The method may include obtaining a model access function of a vehicle interaction machine learning model; obtaining real-time data associated with a vehicle-of-interest; evaluating the real-time data associated with the vehicle-of-interest to form encounter models; monitoring the encounter models with the model access function of the vehicle interaction machine learning model to detect real-time anomalies; and in response to detecting a real-time anomaly, transmitting an alert. Creating the vehicle interaction machine learning model may include: identifying vehicle interactions between vehicles based on vehicle interaction data stored in a historical database; identifying a risk of encounter between two or more selected vehicles based on the identified vehicle interactions; and training the vehicle interaction machine learning model to predict future vehicle interactions based on the identified vehicle interactions and the identified risk of encounter between the two or more selected vehicles.

A method for updating a vehicle interaction machine learning model may include: obtaining trajectory information indicating trajectories of vehicles; analyzing the trajectory information to determine whether a trajectory is a new trajectory type or whether the trajectory is a member of a new interaction; in response to determining the trajectory is a new trajectory type or the trajectory is a member of a new interaction, updating training data for the vehicle interaction machine learning model; and training the vehicle interaction machine learning model based on the updated training data.

A system for updating a vehicle interaction machine learning model may include memory storing instructions; and a processor executing the instructions to perform a process. The process may include obtaining trajectory information indicating trajectories of vehicles; analyzing the trajectory information to determine whether a trajectory is a new trajectory type or whether the trajectory is a member of a new interaction; in response to determining the trajectory is a new trajectory type or the trajectory is a member of a new interaction, updating training data for the vehicle interaction machine learning model; and training the vehicle interaction machine learning model based on the updated training data.

A non-transitory computer-readable medium may store instructions that, when executed by processor(s), cause the processor to perform a method for updating a vehicle interaction machine learning model. The method may include: obtaining trajectory information indicating trajectories of vehicles; analyzing the trajectory information to determine whether a trajectory is a new trajectory type or whether the trajectory is a member of a new interaction; in response to determining the trajectory is a new trajectory type or the trajectory is a member of a new interaction, updating training data for the vehicle interaction machine learning model; and training the vehicle interaction machine learning model based on the updated training data.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 3A depicts a flowchart of a method for creating a vehicle interaction machine learning model, according to one or more embodiments.

FIG. 3B depicts a flowchart of a method of detecting and avoiding loss of separation between vehicles, according to one or more embodiments.

FIGS. 5A-5F depict flowcharts of methods of detecting and avoiding loss of separation between aircraft and methods of updating an airspace interaction machine learning model, according to one or more embodiments.

DETAILED DESCRIPTION OF EMBODIMENTS

Figure 1:
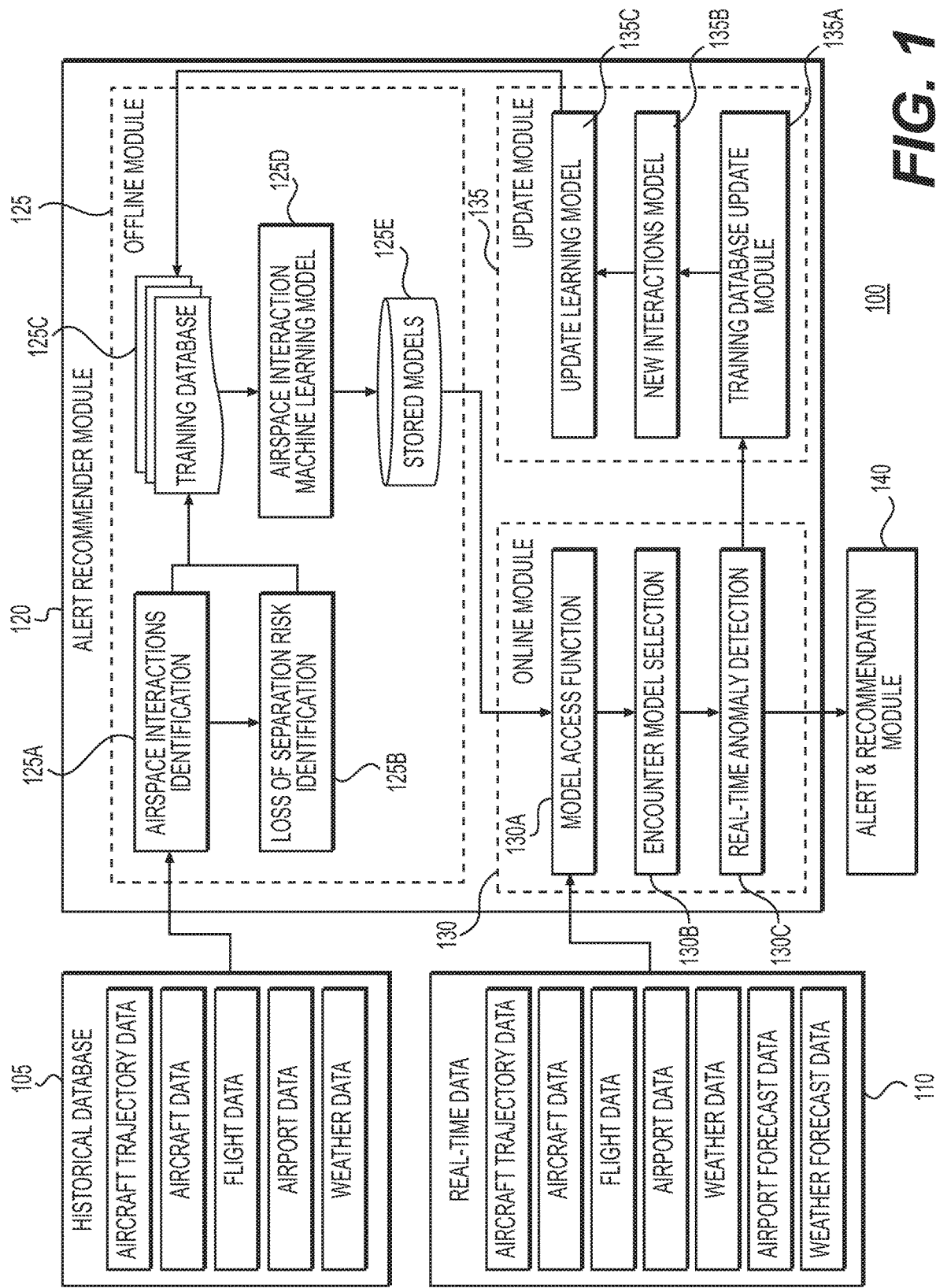
FIG. 1 depicts an exemplary system infrastructure for detecting and avoiding loss of separation between aircraft, according to one or more embodiments.

Various embodiments of the present disclosure relate generally to managing spacing between vehicles and, more particularly, to methods and systems for detecting and avoiding contact between vehicles or for avoiding loss of separation between vehicles and to methods and systems for updating the same.

In general, the present disclosure is directed to managing vehicle spacing, and more specifically to avoiding safety events. Generally, safety events may include contact between vehicles, loss of safe separation between two or more aircraft, or two or more vehicles are within a minimum distance from each other. As described in more detail below, to avoid safety events, the possibility of a safety event must be identified before the safety event occurs so vehicles (or aircraft) may be redirected in time. Specifically, for instance, a system may detect potential oncoming airspace loss of separation events, provide an alert for probable events, and recommend mitigation actions for the relevant aircrafts. In this disclosure, a precursor may be defined as a sequence of events leading to a safety event. A precursor event may be defined as an airspace/vehicle interaction machine learning model indicating a change in trajectory from a planned trajectory. A precursor event may also be called a real-time anomaly.

In one embodiment, the disclosed systems may be used as an ATC alert tool to direct potential incidents, a tool for ATC to recommend arrival and departure paths in the NAS, and a tool for ATC to increase aircraft separation. Alternatively, or at the same time, the system may be incorporated in a flight management system, an electronic flight bag, or a traffic alert system on-board commercial or unmanned aircrafts, for instance to optimize aircraft trajectory routes based on airspace traffic and/or to avoid loss of separation. Though the system is demonstrated in the context of aircraft and aircraft related data (see, e.g., FIGS. 1 and 5A-12B), the same approach can be applied to multiple vehicle problems including autonomous cars, ships, etc., to address similar collision avoidance and loss of separation problems (see, e.g., FIGS. 2, 3A, and 3B).

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, relative terms, such as, for example, "about," "substantially," "generally," and "approximately" are used to indicate a possible variation of ±10% in a stated value. The term "exemplary" is used in the sense of "example" rather than "ideal." As used herein, the singular forms "a," "an," and "the" include plural reference unless the context dictates otherwise.

While this disclosure describes the systems and methods with reference to aircraft (e.g., aircraft loss of separation detection and avoidance system 100), it should be appreciated that the present systems and methods are applicable to detection and avoidance of collisions for any vehicle system, including those of drones, automobiles, trains (locomotives), ships, or any other autonomous and/or Internet-connected vehicle.

The present disclosure will now be described with reference to the appended figures. Specifically, FIG. 1 depicts an exemplary system infrastructure for detecting and avoiding loss of separation between aircraft, according to one or more embodiments. As shown in FIG. 1, an aircraft loss of separation detection and avoidance system 100 may include an alert recommender module 120, a historical database 105, a real-time data 110, and an alert & recommendation module 140. The alert recommender module 120 may include an offline module 125, an online module 130, and an update module 135.

The historical database 105 may include historical data about one or a combination of aircraft trajectory data, aircraft data, flight data, airport data, and weather data. The aircraft trajectory data may include information about one or more of position, altitude, heading, speed, flight path, and flight plan of a plurality of aircraft. Aircraft data may include information about aircraft type of the plurality of aircraft and dimensions/relative sizes of the types of aircraft. Flight data may include information about a flight phase, such as departure, cruise, or arrival for the plurality of aircraft, and if the flight phase is departure/arrival, then information about a runway and time intent for the plurality of aircraft. Airport data may include information about one or more of traffic patterns in 2-D or 3-D space with respect to time and/or amount, operations (such as runways in use, flight delays and planned arrivals and departures), and arrangement of runways for a plurality of airports/terminals. Weather data may include information about one or more of average/seasonal/historical precipitation, wind (amount and/or direction), hail, humidity, turbulence, fog, and visibility for the plurality of airports/terminals or general geographic areas.

The historical data may be cumulative over time or periodically reset and refreshed. The information in the historical database 205 may be collected or received from various data sources, such as Federal Aviation Administration (FAA) System Wide Information Management (SWIM) sources, such as Airport Surface Detection Equipment, Model X (ASDE-X) data and Time-Based Flow Management (TBFM) data (collectively, "airspace data"); Automatic Dependent Surveillance-Broadcast (ADSB) data, which is mandated to be used in the NAS by 2020; and various FAA and weather services.

The real-time data 110 may include current, recent (or most recent), or forecast data about one or a combination of aircraft trajectory data, aircraft data, flight data, airport data, weather data, airport forecast data, and weather forecast data, which have the same features as discussed above with respect to the historical database, except that the real-time data also includes forecast data for airport forecast data and weather forecast data. The real-time data 110 may be gathered by a central service, such as a cloud-based application that may then provide the real-time data 110 as a single stream or broadcast. Alternatively, the real-time data 110 may be gathered and transmitted among aircraft and/or ATC (collectively "group"), like in ad hoc or mesh networks surrounding a certain location(s) (e.g., an airport of the plurality of airports and only aircraft/ATC within a threshold distance of the airport may be include in the group).

The offline module 125 may include an airspace interactions identification section 125a, a loss of separation risk identification section 125b, a training database 125c, an airspace interaction machine learning model 125d, and stored models section 125e.

Offline module 125 may receive historical data from historical database 105 and generate airspace interactions in the airspace interaction identification section 125a. The airspace interactions in the airspace interaction identification section 125a includes combinations/permutations of the plurality of aircraft in a defined region of airspace (e.g., aircraft 1 with respect to aircraft 2, and aircraft 1 with respect to aircraft 3 and aircraft 4, etc.) with respect to one or a combination of aircraft trajectory data, aircraft data, flight data, airport data, and weather data of the historical data (e.g., aircraft 1 approaching runway 1 of airport 1 with respect to aircraft 2 departing runway 3 of airport 1, on a rainy day with high traffic). Furthermore, the airspace interactions may include combinations of aircraft that were not flying at the same time, but that would have been within a threshold distance of each other if the respective aircraft had been flying at the same time. For instance, if an aircraft 1 had flown through a region of airspace that aircraft 2 had flown through at a different time (e.g., aircraft 2 had flown through that region the day before aircraft 1 had flown through that region).

Offline module 125 may analyze the airspace interactions to identify a degree of risk of loss of separation in the loss of separation risk identification section 125b for one or more (up to all) of the airspace interactions. For instance, an airspace interaction of two aircraft more than a threshold distance apart may not be analyzed. The degree of risk of loss of separation in the loss of separation risk identification section 125b may be calculated using a risk algorithm. The risk algorithm may calculate the degree of risk based on a Euclidian distance separating pairs of aircraft and/or a closing speed between the pairs of aircraft (e.g., less than one mile apart and a closing speed of 250 meters per second (m/s) indicates that the aircraft are approaching while already close to/near each other). The risk algorithm may quantify the degree of risk as a binary: zero or one, where one indicates a high degree of risk and zero indicates no risk of collision. Alternatively, the risk algorithm may quantify the degree of risk as a percentage based on a piecewise function or multi-variable function. The piecewise function or multi-variable function may be based on one or more of: (1) Euclidian distance between the aircraft, (2) closing speed, (3) relative sizes of the aircraft, and/or (4) one or a combination of aircraft trajectory data, aircraft data, flight data, airport data, and weather data of the historical data. Moreover, the degree of risk may be calculated for an entire interaction of an airspace interaction ("static risk"); for instance, a degree of risk for aircraft 1 with respect to aircraft 2 for a set period of time may be calculated. Alternatively, the degree of risk may be calculated for each time step of an airspace interaction ("dynamic risk") and the degree of risk may include a time-wise distribution of time steps and corresponding degrees of risk for each time step.

Offline module 125 may store the airspace interactions and the degree of risk for the one or more (up to all) of the airspace interactions in a training database 125*c*. Training database 125*c* may be used to train the airspace interaction machine learning model 125*d*. The airspace interaction machine learning model 125*d* may be trained on training database 125*c* with a supervised learning technique, an unsupervised learning technique, or a reinforcement learning technique. The airspace interaction machine learning model 125*d* may be set up to decide which actions should be taken at each point in time for an Aircraft of Interest (AOI) in an environment to avoid a loss of separation with one or more other aircraft. For instance, the airspace interaction machine learning model 125*d* may be a trained policy (if the airspace interaction machine learning model 125*d* is trained using a reinforcement learning technique), an analytical model, a neural network, or, generally, a model that that takes inputs (e.g., a feature space) and outputs a target based on a trained function. The feature space may be one of the airspace interactions described above (when training in the offline module 125) or one of the encounter models described below (when deployed on the online module 130). The target may be a classification of real-time anomaly detected or not; a classification of stay on track or do not stay on track; or a vector of values indicating stay on track or change track by moving to one of left, right, up, down, speed up/down, or change heading by a set degree, etc.

Specifically, if a reinforcement learning model technique is used, the airspace interaction machine learning model 125*d* may be trained to learn a policy so that the AOI avoids a loss of separation with another aircraft. The AOI, as an agent, may determine to (1) stay on its current trajectory path, or (2) move to a trajectory to the left, right, up, or down, increase or decrease its speed, or a change in heading in degrees. Based on the agent's action(s), the agent is a given a reward (either negative or positive points depending on the action taken with respect to the environment) and the state is updated to the next time step. The point in time at which the policy of a trained airspace interaction machine learning model 125*d*, selects a path/trajectory that differs from that of the current path/trajectory may be defined as a precursor event or a real-time anomaly.

Once the airspace interaction machine learning model 125*d* has been trained on the training database 125*c*, the airspace interaction machine learning model 125*d* may be stored in memory in stored models section 125*e*.

Offline module 125 may be a cloud based/online service that is comprised of servers and/or computers that provide a service to aircraft by providing access to the stored airspace interaction machine learning model 125*d* stored in a memory, or the airspace interaction machine learning model 125*d* may be made available as an Application Programming Interface (API). Alternatively, the offline module 125 may transmit notifications to users (aircraft operators, ATC operators, or their respective computer systems) to download a new version of the airspace interaction machine learning model 125*d*, or the offline module 125 may transmit updates to the users. Furthermore, the offline module 125 may be a server/computer hosted by an entity, such as an airline operator, for instance to manage spacing of aircraft in the airline operator's fleet of aircraft.

The online module 130 may include a model access function section 130*a*, an encounter model selection section 130*b*, and a real-time anomaly detection section 130*c*. As mentioned above, the deployed system, specifically the online module 130, may be hosted on an ATC system as an ATC alert tool to direct potential incidents, a tool for ATC to recommend arrival and departure paths in the NAS, and a tool for ATC to increase aircraft separation. Alternatively, or at the same time, the system may be incorporated in a flight management system, an electronic flight bag, or a traffic alert system on-board commercial or unmanned aircrafts, for instance to optimize aircraft trajectory routes based on airspace traffic and/or to avoid loss of separation. Furthermore, the online module 130 may be hosted by a service provider that can transmit alerts and/or recommendations to ATC or to individual aircraft.

The online module 130 may obtain/receive a model access function and store the model access function in the model access function section 130*a*. The model access function may be a machine leaning model that that takes inputs (e.g., a feature space) and outputs a target based on a trained function, which was trained in the offline module 125. The feature space may be one of the encounter models described below. The target may be a classification of real-time anomaly detected or not; a classification of stay on track or do not stay on track; or a vector of values indicating stay on track or change track by moving to one of left, right, up, down, speed up/down, or change heading by a set degree, etc.

The online module 130 may receive the model access function from the offline module 125. For instance, the online module 130 may transmit a request to the offline module 125 for the model access function, or the offline module 125 may notify the online module 130 of the model access function and transmit the model access function to the online module 130. Moreover, the online module 130 may receive updates/updated versions of the model access function. Furthermore, the online module 130 may receive different versions of the model access function based on parameters of the online module 130; for instance, if the online module 130 is hosted on an ATC system then the model access function may be a version that analyzes airspace interactions for one or more (up to all) aircraft within a given range of the ATC system for loss of separation, while if the online module 130 is hosted on an aircraft ("host aircraft") then the model access function may be a version that analyzes airspace interactions for one or more (up to all) airspace interactions within a given range of the aircraft that includes the host aircraft in the airspace interactions.

The online module 130 may receive the real-time data 110 and generate airspace interactions of current aircraft in the relevant airspace (e.g., around the ATC system or around the host aircraft) based on the real-time data 110. Specifically, the online module 130 may generate airspace interactions that include permutations of a plurality of aircraft (e.g., aircraft 1 with respect to aircraft 2, and aircraft 2 with respect to aircraft 3 and aircraft 4, etc.) with respect to one or a combination of aircraft trajectory data, aircraft data, flight data, airport data, weather data, airport forecast data, and weather forecast data of the real-time data 110 (e.g., aircraft 1 approaching runway 1 of airport 1 with respect to aircraft 2 departing runway 3 of airport 1, on a rainy day with high traffic). Alternatively, in the case of a host aircraft, the online module 130 may generate airspace interactions that include permutations of a single aircraft (the host aircraft) with respect to other aircraft in a defined region of airspace (e.g., within a threshold distance of the single aircraft or only near airports).

The online module 130 may evaluate the real-time data (by evaluating the generated airspace interactions) to form encounter models. Encounter models may be selected airspace interactions that the evaluation of the generated airspace interactions indicates are to be monitored. Airspace interactions may be selected to be monitored based on a selection algorithm. For instance, the selection algorithm may be based on one or more of (1) Euclidian distance between the aircraft, (2) closing speed, (3) relative sizes of the aircraft, and/or (4) one or a combination of aircraft trajectory data, aircraft data, flight data, airport data, weather data, airport forecast data, and weather forecast data of the real-time data 110. For example, the selection algorithm may select airspace interactions that have aircraft within a threshold distance of each and/or have a closing speed above a threshold speed. The encounter models may be stored/indexed/referenced to in the encounter model selection section 130*b*.

The online module 130 may continuously/periodically/in response to external instructions generate new airspace interactions based on the current real-time data 110. The online module 130 may remove/delete airspace interactions that are no longer at risk of a loss of separation event; for instance, if the two relevant aircraft are a threshold distance apart and/or the flight plans indicate that the two aircraft will continue to separate from each other. Alternatively, the online module 130 may remove/delete airspace interactions when the risk algorithm discussed above indicates that the degree of risk is below a minimum threshold. The online module 130 may continuously/periodically/in response to external instructions evaluate the current airspace interactions to form encounter models.

The online module 130 may monitor the encounter models stored in the encounter model selection section 130*b* by using the real-time data 110 to update the underlying airspace interactions of the encounter models. The online module 130 may monitor the encounter models with the model access function stored in the model access function section 130*a* to detect real-time anomalies. Specifically, the model access function may evaluate an encounter model with the airspace interaction machine learning model (whichever version provided to/on the online module 130) to detect real-time anomalies. The model access function may evaluate the encounter model continuously/periodically/in response to an instruction, like from a TCAS system or a user interface based on an input from an ATC operator or pilot. The model access function may detect a real-time anomaly when the airspace interaction machine learning model selects a path/trajectory that differs from that of a current path/trajectory of an aircraft with respect to one or more other aircraft in the relevant airspace interaction. An aircraft may be one of the aircrafts of the relevant airspace interaction. For instance, if the online module 130 is hosted on the ATC system, then one of the aircrafts of the airspace interaction is selected as the aircraft of interest (arbitrary selection or based on features of the airspace interaction); if the online module 130 is hosted by the host aircraft as discussed above, the host aircraft may be the aircraft of interest.

The online module 130 may store the detected real-time anomalies in the real-time anomaly detection section 130*c*. The online module 130 may store in the real-time anomaly detection section 130*c* a snap shot (e.g., a portion or an entire copy) of the real-time data 110 associated with the detected real-time anomalies. A snap shot of the real-time data 110 associated with the detected real-time anomalies may include a portion or an entire copy of the real-time data 110 and may include the real-time data for a period of time before and/or after the real-time anomaly is detected.

In response to detecting a real-time anomaly, the online module 130 may transmit a notification to the alert & recommendation module 140. The alert & recommendation module 140 may be hosted on the same computer system as the online module 130 or it may be hosted on a separate computer system. The alert & recommendation module 140 may transmit an alert with or without a recommended course of action. For instance, the alert & recommendation module 140 may perform one or a more of: transmit an instruction to a display apparatus to display the alert; transmit an instruction to the display apparatus to display the alert with the recommended course of action; transmit an instruction to an audio apparatus to audibly indicate the alert with or without the recommended course of action; and transmit an alert message to an off-board service (e.g., from the host aircraft to ATC so that the online module 130 notifies the ATC that the host aircraft needs to be redirected). The recommended course of action may be interpretable by an ATC operator or an aircraft pilot (or in the case of a vehicle, as discussed below, an operator of the vehicle).

The online module 130 may transmit detected real-time anomalies to the update module 135 with the snap shot of the real-time data associated with the detected real-time anomalies. The online module 130 may automatically transmit newly detected real-time anomalies or periodically send reports of detected real-time anomalies, or the online module 130 may transmit the detected real-time anomalies in response to a request from the update module 135. The update module 135 may be hosted on the same computer system as the online module 135 or it may be hosted on a separate computer system (e.g., the same computer system as the offline module 125).

Alternatively, as discussed below with respect to FIGS. 5A-5F, the online module 130 may transmit all data associated with a set period of time to the update module 135, and the update module 135 may process all the data associated with the set period of time to detect new trajectories and/or new interactions.

The update module 135 may include an update learning module 135*a*, a new interactions model section 135*b*, and an update learning model section 135*c*. The update module 135 may analyze the detected real-time anomaly and the associated snap shot of the real-time data in the training database update module 135*a*. The training database update module 135*a* may identify new airspace interactions (and associated degree of risk) and store the new airspace interactions in the new interactions model section 135*b*. The update learning model section 135*c* may transmit a message to the offline module 125 with the new interactions stored in the new interactions model section 135*b* to the offline module 125 so that the training database 125*c* may be updated. Therefore, as the alert recommender module 120 experiences new environments and detects new airspace interactions, the airspace interaction machine learning model 125*d* may be updated to be more accurate or more robust. For instance, as the airspace interaction machine learning model 125*d* is updated, it may be able to handle more edge cases.

The historical database 105, the offline module 125, the online module 130, the update module 135, and the alert & recommendation module 140 may be hosted on one device, distributed on different devices, or some combination thereof. For instance, a central server may host the offline module 125 and the historical database 105, while the online module 130, the update module 135, and the alert & recommendation module 140 may be hosted by an ATC computer in an ATC installation or by an electronic flight bag/avionics system on-board an aircraft.

Figure 2:
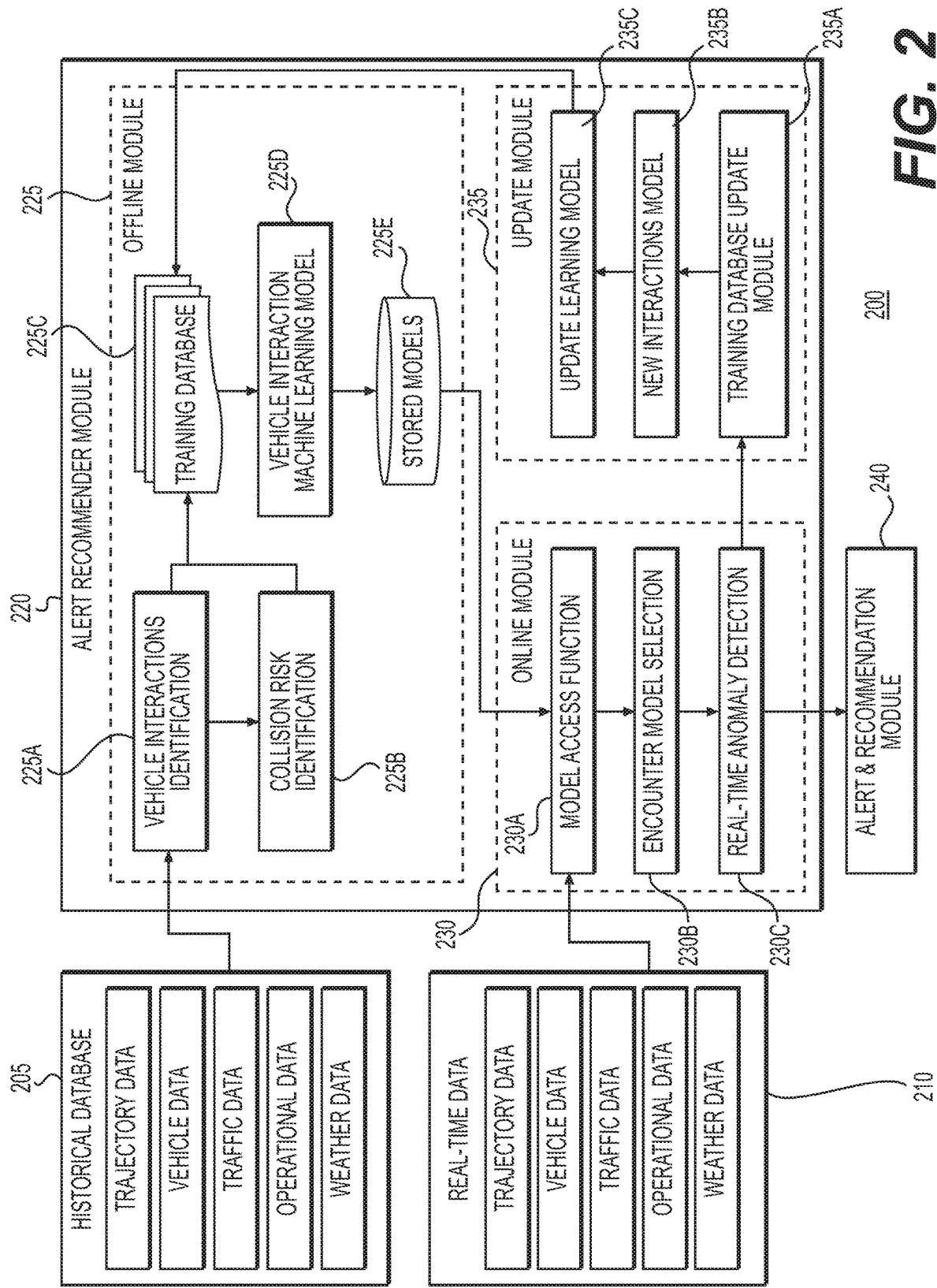
FIG. 2 depicts an exemplary system infrastructure for detecting and avoiding loss of separation between vehicles, according to one or more embodiments.

FIG. 2 depicts an exemplary system infrastructure for detecting and avoiding loss of separation between vehicles, according to one or more embodiments. As shown in FIG. 2, a vehicle collision detection and avoidance system 200 may include an alert recommender module 220, a historical database 205, real-time data 210, and an alert & recommendation module 240. The alert recommender module 220 may include an offline module 225, an online module 230, and an update module 235.

The vehicle collision detection and avoidance system 200 may be the same as the aircraft loss of separation detection and avoidance system 100, except for: (1) the data stored in the historical database 205 and the real-time data 210, and (2) certain portions the offline module 225 may have a vehicle interactions identification section 225*a* (instead of the airspace interactions identification section 125*a*), a collision risk identification section 225*b* (instead of the loss of separation risk identification section 125*b*), and a vehicle interaction machine learning model 225*d* (instead of the airspace interaction machine learning model 125*d*).

Specifically, the historical database 205 may include historical data about one or a combination of trajectory data, vehicle data, traffic data, operational data, and weather data.

The trajectory data may include information about one or more of position, heading, speed, vehicle path, and vehicle route of a plurality of vehicles. Vehicle data may include information about vehicle type of the plurality of vehicle and dimensions/relative sizes of the types of vehicle. Information about the vehicle route may include information for a phase of route (such as leaving/departure, arriving/arrival, takeoff, landing, cruise, ascent, descent, in route, etc.), arrival destination, departure destination, or route (e.g., a three dimensional path from departure destination to arrival destination with or without respect to time) for the plurality of vehicles. The information about the vehicle route may also include, if the phase of route is departure/arrival, information for a location map or traffic map (e.g., of a city or terminal) for the arrival destination or departure destination and time intent for the plurality of vehicles. Traffic data may include information about one or more of traffic patterns in 2-D or 3-D space with respect to time and/or amount. Operations data may include information one or more of terminals in use, vehicle delays and planned arrivals and departures, and arrangement of terminals. Weather data may include information about one or more of average/seasonal/historical precipitation, wind (amount and/or direction), hail, humidity, turbulence, fog, and visibility for the plurality of terminals or general geographic areas.

The historical data may be cumulative over time or periodically reset and refreshed. The information in the historical database 205 may be collected or received from various data sources.

The real-time data 210 may include current, recent (or most recent), or forecast data about one or a combination of trajectory data, vehicle data, traffic data, operational data, and weather data, which have the same features as discussed above with respect to the historical database, except that the real-time data also includes forecast data for traffic data, operations data, and weather forecast data. The real-time data 210 may be gathered by a central service, such as cloud-based application that may then provide the real-time data 210 as a single stream or broadcast. Alternatively, the real-time data 210 can be gathered and transmitted among vehicles (collectively "group"), like in ad hoc or mesh networks surrounding a certain location(s) (e.g., a city or harbor and only vehicles within a threshold distance of the city or harbor may be include in the group).

FIG. 3A depicts a flowchart of a method for creating a vehicle interaction machine learning model, according to one or more embodiments. For instance, the method for creating the vehicle interaction machine learning model may include: at block 300, identifying vehicle interactions between vehicles based on vehicle interaction data stored in a historical database; then, the method may proceed to block 305, identifying a risk of encounter between two or more selected vehicles based on the identified vehicle interactions; then, the method may proceed to block 310, training the vehicle interaction machine learning model to predict future vehicle interactions based on the identified vehicle interactions and the identified risk of encounter between the two or more selected vehicles.

FIG. 3B depicts a flowchart of a method of detecting and avoiding loss of separation between vehicles, according to one or more embodiments. The method for detecting and avoiding loss of separation between vehicles may include: at block 315, obtaining a model access function of a vehicle interaction machine learning model; then, the method may proceed to block 320, obtaining real-time data associated with a vehicle-of-interest; then the method may proceed to block 325, evaluating the real-time data associated with the vehicle-of-interest to form encounter models; then the method may proceed to block 330, monitoring the encounter models with the model access function of the vehicle interaction machine learning model to detect real-time anomalies; and then the method may proceed to block 335, in response to detecting a real-time anomaly, transmitting an alert.

Figure 3C:
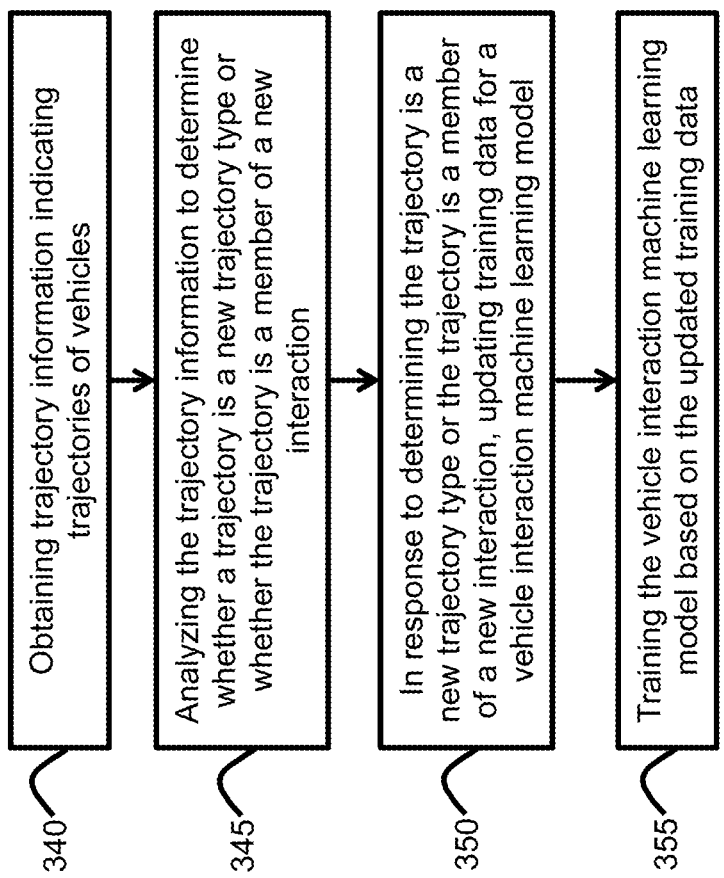
FIG. 3C depicts a flowchart of a method of updating a vehicle interaction machine learning model, according to one or more embodiments.

FIG. 3C depicts a flowchart of a method of updating a vehicle interaction machine learning model, according to one or more embodiments. The method for updating a vehicle interaction machine learning model may include: at block 340, obtaining trajectory information indicating trajectories of vehicles; then, the method may proceed to block 345, analyzing the trajectory information to determine whether a trajectory is a new trajectory type or whether the trajectory is a member of a new interaction; then, the method may proceed to block 350, in response to determining the trajectory is a new trajectory type or the trajectory is a member of a new interaction, updating training data for the vehicle interaction machine learning model; and then, the method may proceed to block 355, training the vehicle interaction machine learning model based on the updated training data.

Figure 4:
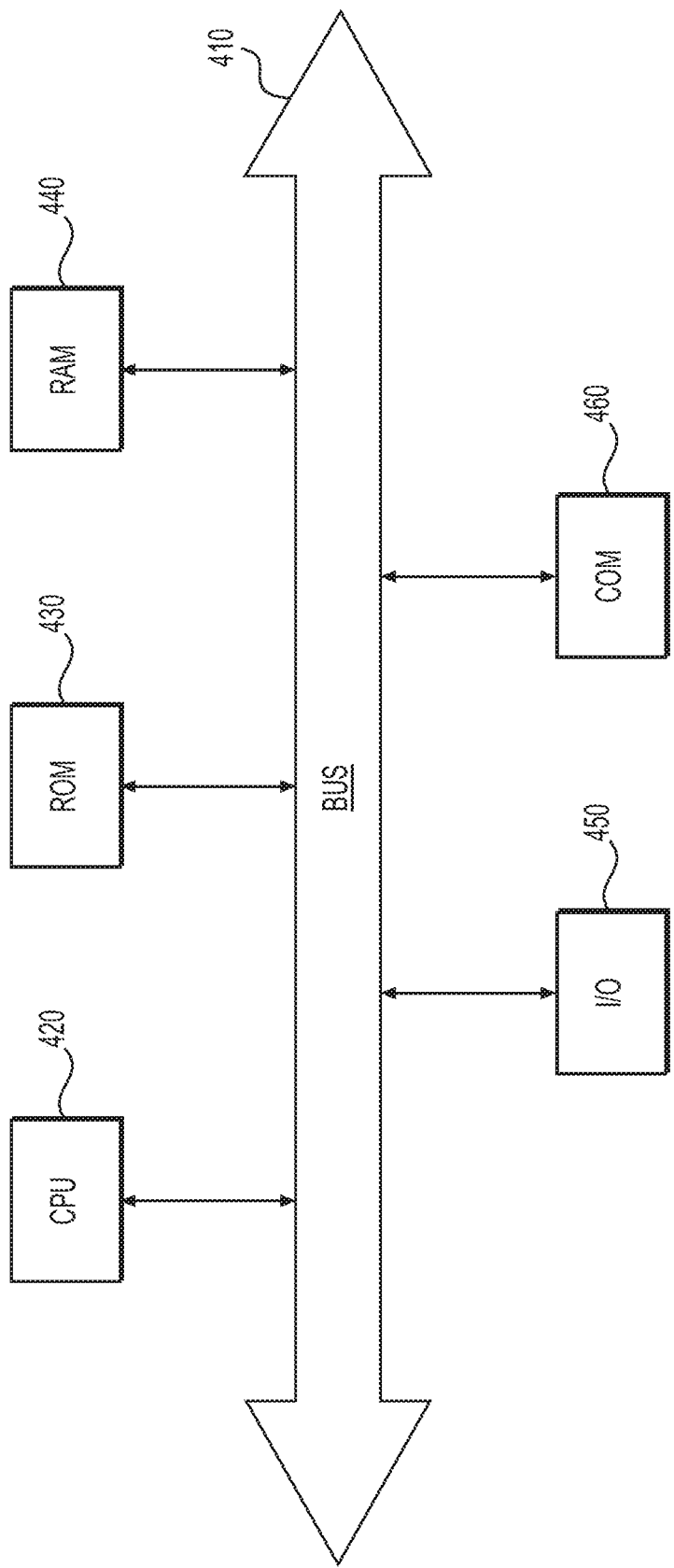
FIG. 4 depicts an example system that may execute techniques presented herein.

FIG. 4 depicts an example system that may execute techniques presented herein. FIG. 4 is a simplified functional block diagram of a computer that may be configured as any of the systems of FIG. 1 or FIG. 2 to execute techniques described herein, according to exemplary embodiments of the present disclosure. Specifically, any of (or combinations of) the alert recommender module 120/220, the offline module 125/225, the online module 130/230, the update module 135/235, the historical database 105/205, the real-time data 110/210, and the alert & recommendation module 140/240, may be an assembly of hardware 400 ("platform"/"system") including, for example, a data communication interface 460 for packet data communication. The platform 400 may also include a central processing unit ("CPU") 420, in the form of one or more processors, for executing program instructions. The platform 400 may include an internal communication bus 410, program storage, and data storage for various data files to be processed and/or communicated by the platform such as ROM 430 and RAM 440, although the platform 400 may receive programming and data via network communications. The platform 400 also may include input and output ports 450 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

Any suitable system infrastructure may be put into place to allow for the above described processes and methods. FIGS. 1-3B and 5A-12B and the above discussion provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIGS. 1-3B and 5A-12. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

FIGS. 5A-5F depict flowcharts of methods of detecting and avoiding loss of separation between aircraft and methods of updating an airspace interaction machine learning model, according to one or more embodiments.

FIGS. 5A and 5B depict flowcharts of methods of updating an airspace interaction machine learning model. In flowchart 500 of FIG. 5A, a processor may correspond to the processor that executes the online module 130 or the update module 135. The processor may receive new data of trajectories ($T_{new}$) for a set period of time (block 502). The set period of time may be one day, a period of hours, or multiple days, and the update process may occur overnight. For each trajectory (t) in new data $T_{new}$, the processor may (in block 504) determine whether a minimum distance (for trajectory types (g) in stored trajectory types ($G_{new}$)) between the trajectory t in new data $T_{new}$ and the trajectory type g in stored trajectory types $G_{new}$ is more than a threshold dissimilarity $\delta$. If a minimum distance for a trajectory t is more than the threshold dissimilarly $\delta$, then the trajectory t is added as a potential new trajectory type in the stored trajectory types $G_{new}$. If the minimum distance for a trajectory t is less than/equal to the threshold dissimilarly $\delta$, then the trajectory t is added as a member of an old trajectory type (or potential new trajectory type that does not have sufficient history) in the stored trajectory types $G_{new}$. In block 506, the processor may determine if any potential new trajectory type g has sufficient history. If the processor determines that no potential new trajectory type g has sufficient history, then the process may return for the next period's batch of new data $T_{new}$. A sufficient history may be more a threshold number of similar trajectories (e.g., based on threshold dissimilarity $\delta$ above). In block 508, if one or more potential new trajectory type g has sufficient history, then the processor may verify the potential new trajectory type g by, e.g., data analysis or human feedback. In block 510, if the potential new trajectory type g is verified, the processor may create the potential new trajectory type g as a new trajectory type with assigned segments s to form $g^s$; then, the processor may update a training database (like training database 125c above) and update a stored airspace interaction machine model with the new trajectory type $g^s$ and updated training database.

In flowchart 520 of FIG. 5B, a processor may correspond to the processor that executes the online module 130 or the update module 135. The processor may receive new data of trajectories for a set period of time in block 522. The set period of time may be one day and the update process may occur overnight. The processor may determine if a trajectory of the new data is a completely new type (in block 524a) or if the trajectory belongs to a previously identified new type (in block 524b). The processor may update a trajectory database in block 526. Updating the trajectory database may include updating model training trajectory types and updating the database to include new trajectory types or segments thereof. The processor may determine whether any new trajectory type has sufficient history built up in block 528. The processor may verify a new trajectory type if it has sufficient history (otherwise, the processor may return to the next batch of new data of trajectories) in block 530. In block 532, if the new trajectory type is verified, the processor may update a training database with the new trajectory type and retrain an airspace interaction machine model based on the updated training database and with the new trajectory type.

Blocks 502 and 504 of FIG. 5A, and blocks 522, 524a, 524b, and 526 of FIG. 5B, respectively, may be processed by processor each set period of time (e.g., overnight). Blocks 506, 508, and 510 of FIG. 5A, and blocks 528, 530, and 532 of FIG. 5B, may be processed by processor as a batch in response to a new trajectory type having a sufficient history.

Figure 5C:
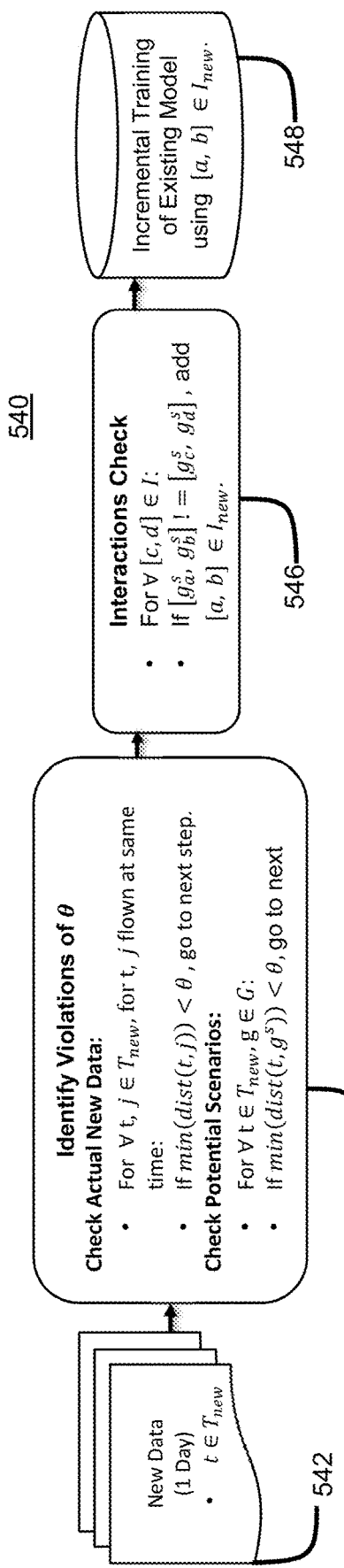
Figure 5D:
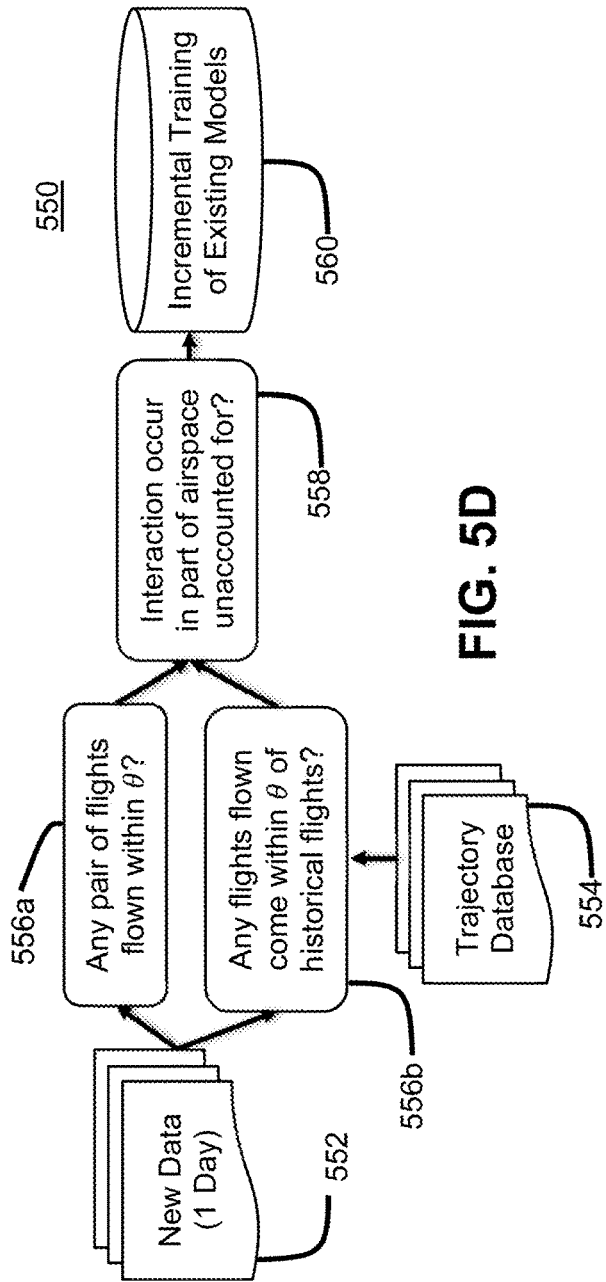

FIGS. 5C and 5D depict flowcharts of methods of updating an airspace interaction machine learning model. In flowchart 540 of FIG. 5C, a processor may correspond to the processor that executes the online module 130 or the update module 135. The processor may receive new data of trajectories ($T_{new}$) for a set period of time (block 542). The set period of time may be one day and the update process may occur overnight. In block 544, for each trajectory (t) in new data $T_{new}$, the processor may (in block 504) determine if (for all other trajectories j in new data of trajectories $T_{new}$ flown at the same time as trajectory t) a minimum distance between the trajectory t is less than a threshold distance $\theta$ away from trajectories j; alternatively or in conjunction, the processor may determine if (for all trajectory types g in stored trajectory types $G_{new}$), a minimum distance between the trajectory t is less than the threshold distance $\theta$ away from the trajectories types g. In block 546, in either case where the trajectory t is less than the threshold distance $\theta$ away, the processor may check whether trajectory t & trajectory j and/or trajectory t & trajectory type g (where t=a and j or g=b in FIG. 5C) are equivalent to one or more interactions i in interactions database I based on a distance between aircraft of the trajectories (e.g., within a threshold distance θ of each) and/or closing speeds of the aircraft (e.g., above a threshold speed), where interactions i include all combinations in interactions database I (with interaction i represented by [c,d]). If the trajectory t & trajectory j and/or trajectory t & trajectory type g are not equal to one or more interactions i, then the processor may add the trajectory t & trajectory j and/or trajectory t & trajectory type g to the interactions database I as a new interaction i. In block 548, based on new interaction i, the processor may update training database and update the airspace interaction machine learning model.

In flowchart 550 of FIG. 5D, a processor may correspond to the processor that executes the online module 130 or the update module 135. The processor may receive new data of trajectories for a set period of time in block 552. The processor may, based on a trajectory database 554, determine whether any pair of flights flown at the same time were within a threshold distance (in block 556a) or whether any flights flown come within the threshold distance of historical flights included in the trajectory database 554 (in block 556b). In block 558, in either case of a flight within the threshold distance, the processor may determine if the interaction is equivalent to any of interactions stored in an interactions database of previously identified interactions, based on the trajectory types, closing speeds, etc. For instance, to determine if interactions are equivalent, the processor may determine whether the interaction occurs in a part of airspace unaccounted for by stored interactions. For instance, to determine if the interaction occurs in a part of the airspace unaccounted for by the stored interactions, the processor may determine a tile space for each interaction and determine if the tile space of the new interaction intersects with any of the tile spaces for the stored interactions. A tile space may be geographic area and/or speed profile associated with a segment of a trajectory for a first aircraft that is closest to a segment of a trajectory of a second aircraft within the threshold distance from the first aircraft. If the processor determines that the interaction occurred in a part of the airspace unaccounted for by stored interactions, then the processor may update the training database and update the airspace interaction machine learning model in block 560.

Figure 5E:
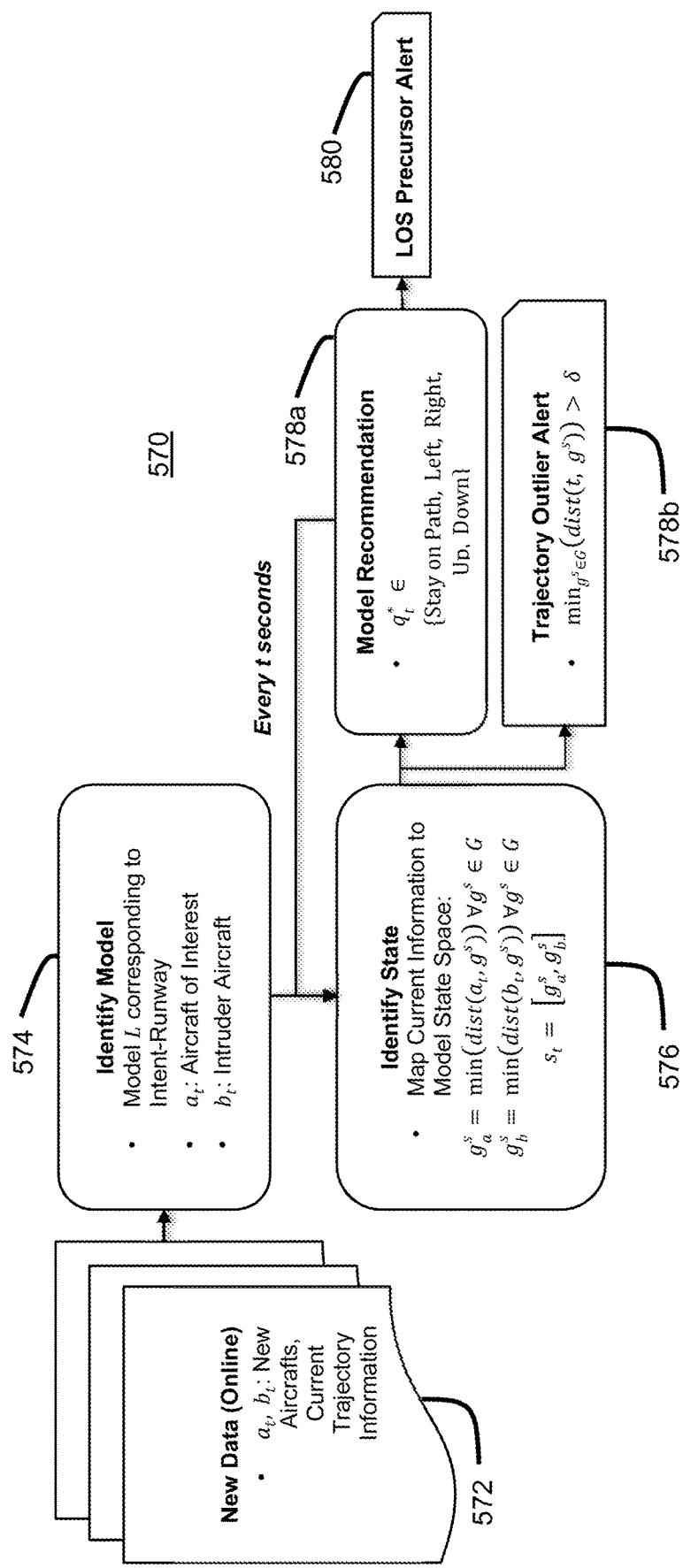
Figure 5F:
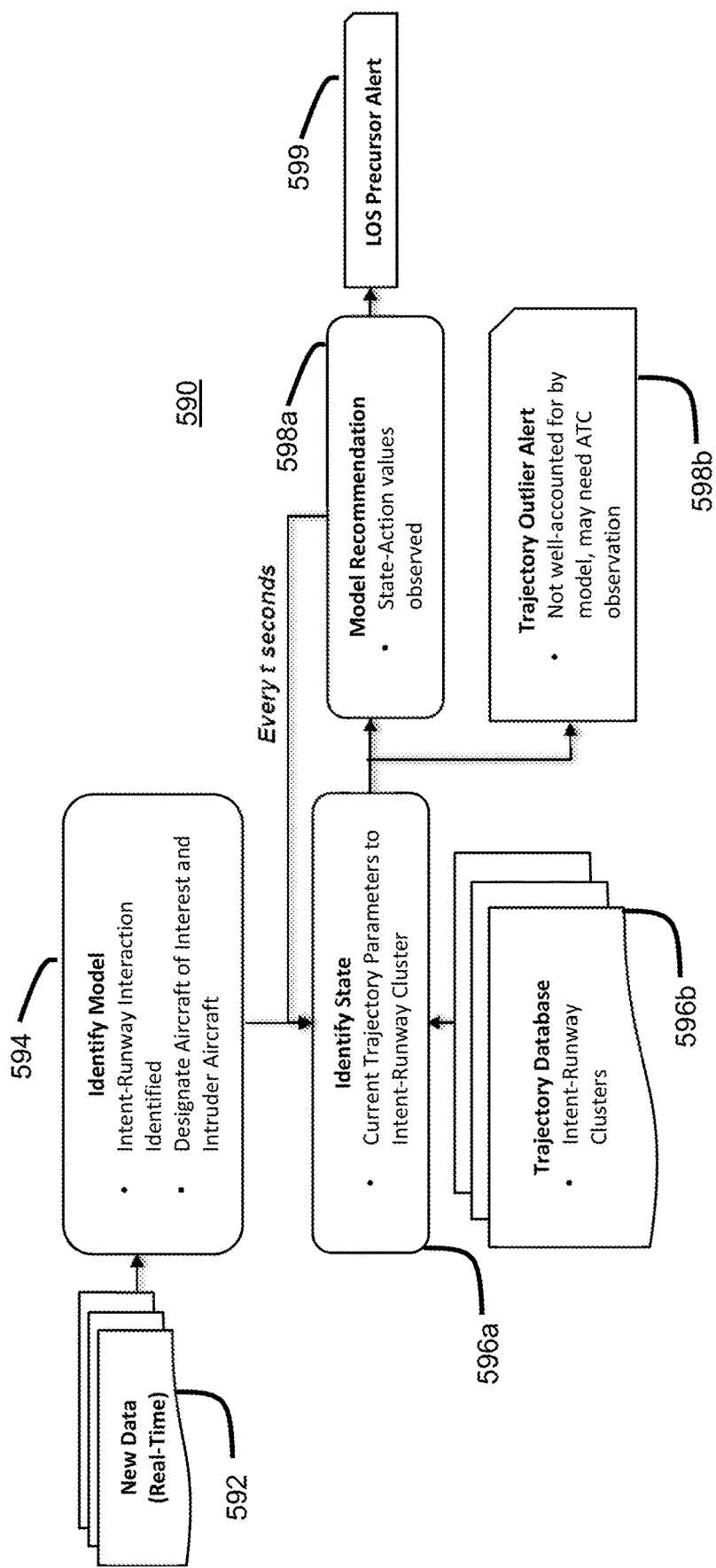

FIGS. 5E and 5F depict flowcharts of methods of detecting and avoiding loss of separation between aircraft online. In flowchart 570 of FIG. 5E, a processor may correspond to the processor that executes the online module 130. In block 572, the processor may receive new data that includes data for new aircrafts and current trajectory information for all aircraft. In block 574, the processor may identify a model L for an aircraft of interest $a_t$ and an intruder aircraft $b_t$ from the new data. In block 576, the processor may identify a state of an environment by mapping current information to a model state space by: $g_a^s = \min(\text{dist}(a_t, g^s)) \forall g^s \in G$; $g_b^s = \min(\text{dist}(b_t, g^s)) \forall g^s \in G$; and $s_t = [g_a^s, g_b^s]$, where $g_s$ is all trajectory types in stored trajectory types G. In block 578a, the processor may provide a recommendation $q_t^*$ from among one or more of stay path, move to left, right, down, up, speed up, slow down, or change heading. Further, in block 578b, the processor may transmit a trajectory outlier alert if a minimum distance for all trajectory types compared to the trajectory t (either trajectory $a_t$ and/or trajectory $b_t$) is greater than a threshold similarity δ. If the processor recommends stay on path, the processor may return to block 576 every set period of time (e.g., every t seconds) the processor recommends stay on path. If the processor recommends anything else, the processor may transmit a LOS precursor alert in block 580.

In flowchart 590 of FIG. 5F, a processor may correspond to the processor that executes the online module 130. In block 592, the processor may receive new data in real-time. In block 594, the processor may identify a model based on an intent-runway interaction (e.g., runway 22 departure and runway 32 arrival) and designate one aircraft as an aircraft of interest and another aircraft (of a plurality of other aircraft) as an intruder aircraft. In block 596a, the processor may obtain trajectory database 596b (that has stored trajectory patterns), and identify a state based on current trajectory parameters (based on new data in real-time) and the stored trajectory patterns. In block 598a, the processor may output a model recommendation based on the identified state, where the model recommendation may issue a LOS precursor alert 599 or return to identify the state every set period of time (e.g., every t seconds). Furthermore, in block 598b, the processor may transmit a trajectory outlier alert if a trajectory of the aircraft of interest and/or the intruder aircraft are not well-accounted for by the airspace interaction machine learning model. The trajectory outlier alert may be transmitted to an ATC so that the ATC may observe the aircraft involved.

Trajectories and trajectory types may include path and/or location with associated speed for an aircraft in 4D space-time. A minimum distance between a first trajectory and a second trajectory may be determined by sampling location points from each of the first trajectory and the second trajectory, comparing the location points to determine a distance between the points, and summing the distances to determine a dissimilarity value, which may be more than, equal to, or less than the threshold dissimilarity δ. The minimum distance algorithm described above may be one example of how to determine whether a trajectory is a new type; however, there are numerous processes that can determine a similarity/dissimilarity value between a first trajectory and a second trajectory. For instance, the dissimilarity value (or inverted similarity value) may be calculated using an algorithm of one or more of the following classes of algorithms: Euclidean similarity measure (distance between points at same time instance for each trajectory, if flying at a same time or simulated flying at time); Dynamic Time Warping; Longest Common Sub-Sequence; and Fréchet distance.

Example Process for Creating an Airspace Interaction Machine Learning Model

FIGS. 6-8B depict illustrative graphics that explain an exemplary process for creating an airspace interaction machine learning model, according to one or more embodiments.

To detect precursor events to loss of separation events (LOS), a machine learning model needs data cases either labelled or established within the set of available data as general airspace interactions and safety events to be detected. This type of information needs to be created, generally from various data sources.

Some data sources may be Federal Aviation Administration (FAA) System Wide Information Management (SWIM) sources, such as Airport Surface Detection Equipment, Model X (ASDE-X) data and Time-Based Flow Management (TBFM) data (collectively, "airspace data"). ASDE-X data contains aircraft track data within a 13-mile radius of an airport that may be useful for identifying and characterizing airspace interactions and potential safety events in an airspace around a terminal (i.e., an airport).

One technique for labeling airspace interactions as a safety event for a supervised learning task of the airspace interaction machine learning model may utilize self-separation and separation calculations between aircraft in the airspace data to label specific airspace interactions that include precursor events ("tagging" or tagged airspace interactions). These tagged airspace interactions may be indexed by time and geography/airspace.

One specific source of self-separation and separation calculation is TCAS data. To perform a collision avoidance function, TCAS may use two calculations: range tau and vertical tau. Range tau is the time to closest point of approach, while vertical tau is the time to co-altitude between two aircraft. Consequently, range tau may be associated with a horizontal separation, whereas vertical tau may be associated with a vertical separation. Each tau calculation may be in seconds. Range tau is shown in Equation 1 below.

TCAS Range Tau Calculation $$\text{Range } \tau = \frac{3600 \times \text{Slant Range (nm)}}{\text{Closing Speed (knots)}} = \frac{\text{Slant Range (m)}}{\text{Closing Speed (m/s)}} \quad \text{Equation 1}$$

To identify precursors to safety events, range tau and Euclidean distance, in meters, may be parameterized to identify and characterize airspace interactions.

For instance, separation calculations may be calculated using surveillance data from two weeks of data at LaGuardia (LGA) airport. The surveillance data may include aircraft position, aircraft speed, and aircraft heading at each time second. Separation calculations may produce data for one or more of closing speed, slant range, Euclidean distance, altitude difference, and range tau, as between any two aircraft of aircraft currently in the airspace (collectively "separation data"). The separation data may be analyzed to determine patterns and/or statistically relevant data types for a machine learning algorithm to detect and avoid loss of separation.

Figure 6:
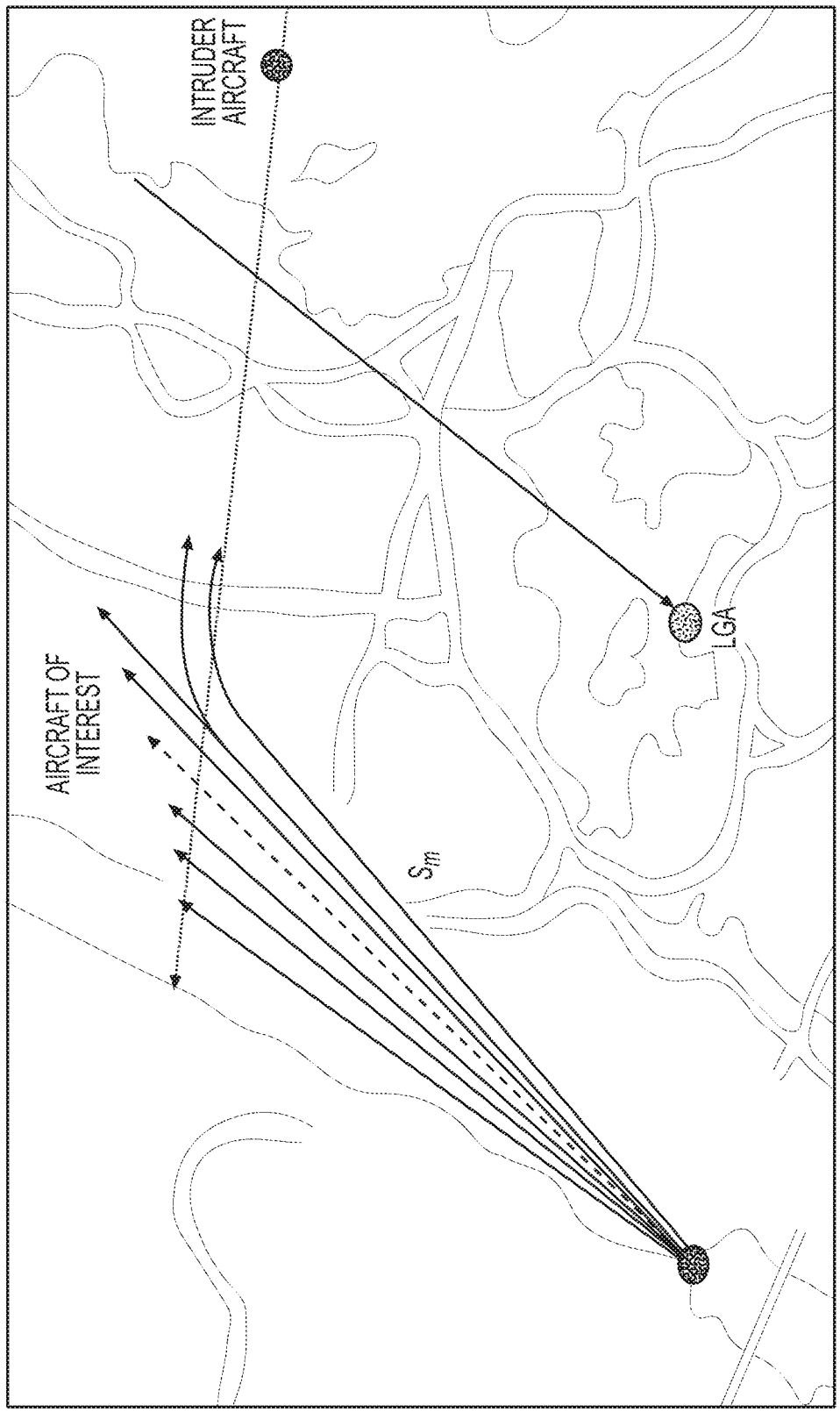
FIGS. 6-8B depict illustrative graphics that explain an exemplary process for creating an airspace interaction machine learning model, according to one or more embodiments.

FIG. 6 depicts an illustrative graphic that explains the model parameters and how to design an airspace interaction machine learning model to detect precursor events.

Multiple conditions may be met to create an effective approach for detecting precursor events to safety events. The conditions may include: accurately modeling space-to-time relationships, predicting events before they occur, and detecting events involving multiple aircraft. One approach may be to utilize a reinforcement learning model for detecting precursors to safety events. The reinforcement learning model may be set up to decide which actions should be taken at which point in time for an "Aircraft of Interest" to avoid LOS with another aircraft.

The model parameters of the reinforcement learning model may be defined as the following set of data created from the surveillance data: (1) Trajectory Database and (2) Set of Aircraft Interactions. The trajectory database may include information of historically flown trajectories segmented by aircraft type, runway, and intent (arrival/departure). The set of aircraft interactions may be within the trajectory database, and it may consist of the set of Airport-Intent-Runway scenarios (e.g., a LGA Runway 22 Arrival or LGA Runway 13 Departure).

From the set of aircraft interactions, two specific flights are chosen and the following may be defined:

(1) Aircraft of Interest (AOI). Labeled as m. AOI's movement is tracked and rewarded in the model.

(2) Intruder Aircraft (IA). Labeled as n. IA's movement is tracked in the model.

(3) Generated Plans. Labeled as $p_m$ and $p_n$. Generated plans may be for a specific aircraft interaction. These are the planned trajectories of each aircraft, which consist of specific trajectories in the trajectory database, where AOI m is allowed to make changes in movement from this plan and IA n is not. Each plan may contain speed, heading, latitude, longitude, and altitude along the track.

(4) Trajectory Set. Labeled as $S_m$. This may contain a set of trajectories with the same intent as the AOI m and within which this aircraft may make movements.

(5) Separation Threshold. Labeled as θ. Separation threshold may be the minimum separation distance for AOI m and IA n, in meters.

FIG. 6 depicts an example of the model parameters and the above definitions. Specifically, AOI m, IA n, and the trajectory set $S_m$, are depicted in relation to LGA. The original trajectory of the AOI m is depicted as a dashed line and the trajectory set $S_m$ is depicted as solid lines, while the trajectory of the IA n is depicted as a dotted line, for an Arrival-Departure scenario from LGA. The AOI m, depicted as solid and dashed lines, is heading to land on Runway 22 at LGA, while the IA n, depicted as a dotted line, departed from Runway 13.

Given the model parameter and definitions defined above, the goal of the airspace interaction reinforcement learning model is to learn an optimal policy for the AOI m to take to avoid LOS (as indicated by separation threshold θ) with the IA n.

The environment of the reinforcement learning model is defined as follows:

(1) State (s). The current state is described by the location of each aircraft within the airspace and the agent's current plan trajectory in $S_m$.

(2) Agent Actions (a). The agent is the AOI m. The agent may stay on its current trajectory path, or move to a trajectory to the left, right, up or down of that trajectory within $S_m$. The movement may be constrained by an allowed heading deviation, current aircraft position, and current speed. If the agent selects a switch in trajectories, the new trajectory becomes the updated trajectory in the model. Actions occur at fixed time increments of t.

The reward structure (r) for the AOI m may be as follows:

(1) Maximum negative reward. A maximum negative reward (e.g. −10,000 points) may be given for actions that brought the aircrafts within the separation distance θ of each other.

(2) Small negative reward. A small negative reward may be given (e.g., −50 points) for the AOI m switching plans, thereby encouraging the AOI m to stay its course unless necessary.

(3) Minimum negative reward. A Minimum negative reward (e.g., −1 point) may be given for each time step.

The value function of the model represents state-action values and is defined by Equation 2 below.

$$\hat{v}(s_t, a_t) = r_{t+1} + \gamma \hat{v}(s_{t+1}, a_{t+1}, \omega_t) \quad \text{Equation 2. Value Function}$$

Where: $w_t$ is the set of parameters of the function approximation technique used to represent the state space to the learning algorithm and all other parameters are listed above.

Figure 7B:
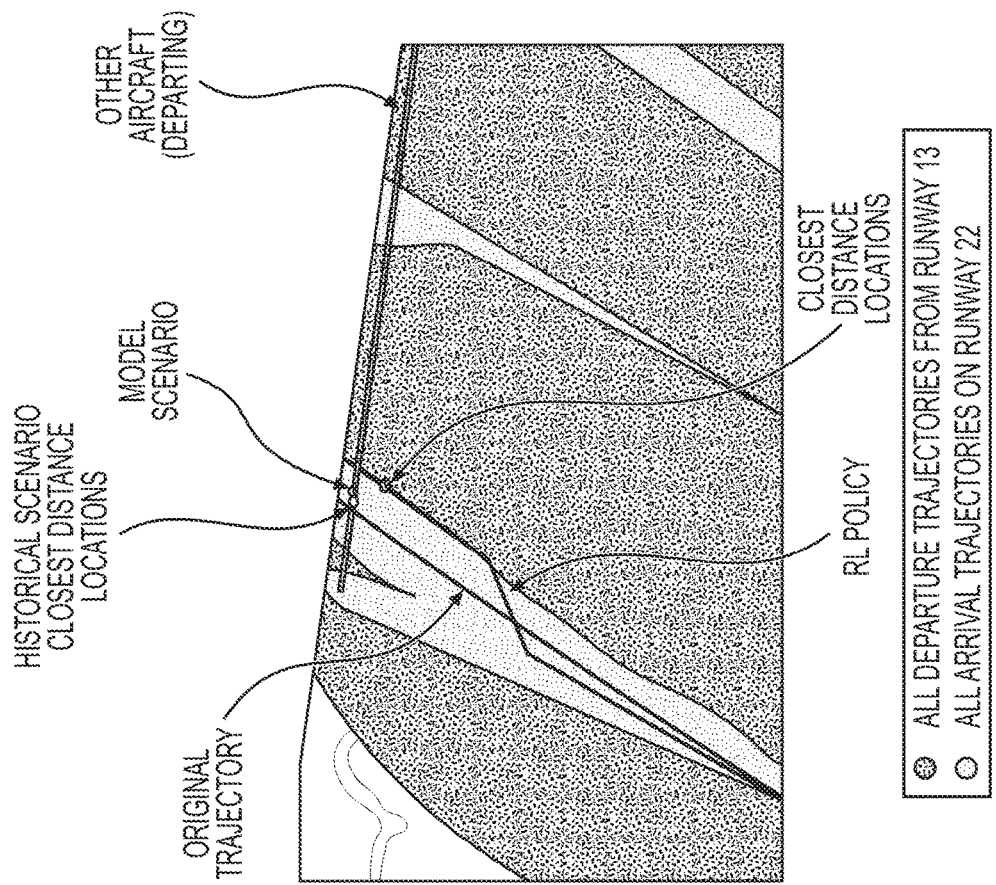
Figure 7A:
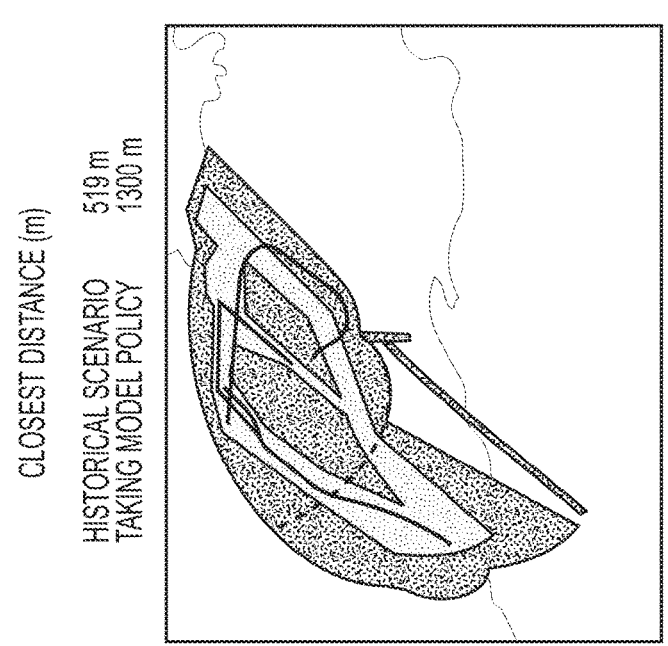

FIGS. 7A and 7B depict an illustrative graphic that explains a result of applying the reinforcement learning approach to the airspace interaction machine learning model.

Common interactions may be used as training and testing scenarios for the airspace interaction machine learning model with using the reinforcement learning approach. FIGS. 7A and 7B depict the results of applying the airspace interaction machine learning model to a specific example scenario. Specifically, FIGS. 7A and 7B depict a Runway 22

Arrival-Runway 13 Departure interaction at LGA. In the surveillance data discussed above, the Runway 22 Arrival and the Runway 13 Departure aircrafts came within 519 meters of each other. Applying the airspace interaction machine learning model, as described above: the Runway 22 Arrival was set as the AOI m, the Runway 13 Departure was set as the IA n, and the model parameters were set as follows: a time step of ten seconds, a heading deviation of 30 degrees for actions where the AOI m aircraft chose not to stay on its current plan, and a separation threshold $\theta=800$ m (around one-half mile). The AOI m was given ten trajectories as a set of trajectories $S_m$.

FIGS. 7A and 7B depict an overview of the environment on the left in FIG. 7A and a zoomed in view of the environment on the right in FIG. 7B. In both FIGS. 7A and 7B, the light shading depicts all arrival trajectories on Runway 22 and darker shading indicates all departure trajectories on Runway 13.

The results of the reinforcement learning for the airspace interaction machine learning model are depicted as RL Policy, which deviates from the original trajectory of AOI m. RL Policy increases the closest distance between other aircraft (departing) (IA n in model) from historical scenario closest distance of 519 meters to taking model policy closest distance of 1300 meters. Therefore, the airspace interaction machine learning model found a policy in which the AOI m aircraft would have maintained the separation threshold $\theta$ and avoided a safety event (e.g., LOS event).

Figure 8B:
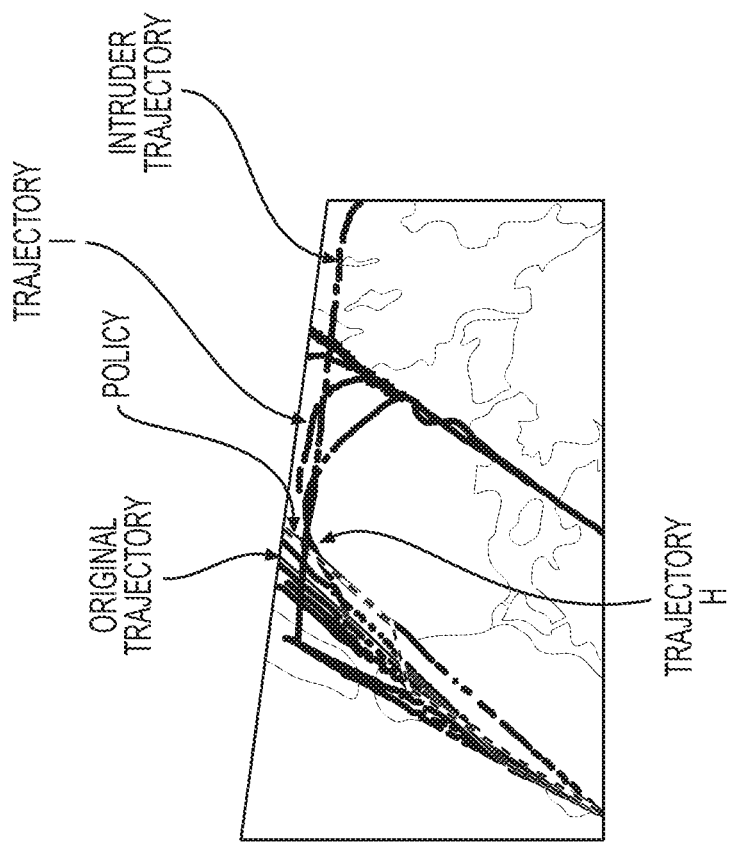
Figure 8A:
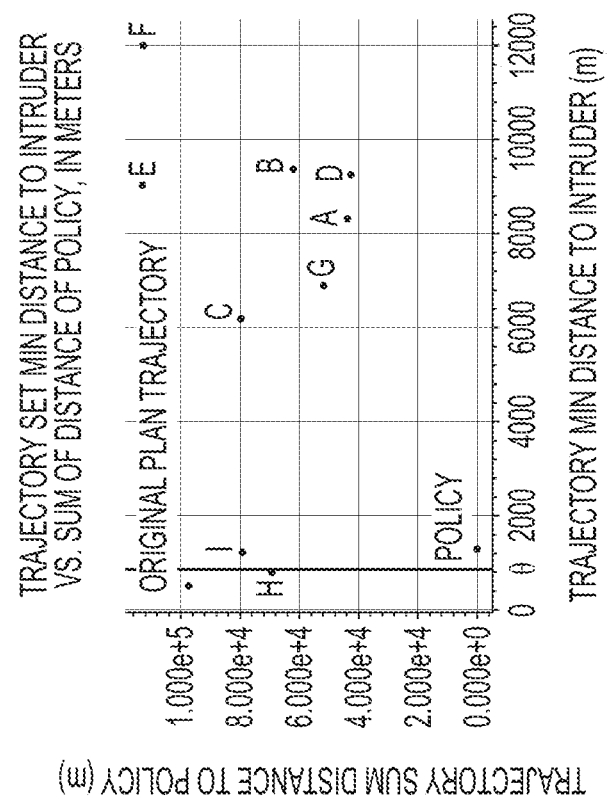

FIGS. 8A and 8B depict an illustrative graphic that explains a comparison of the policy trajectory to others given in the trajectory set Sm.

The point in time where the reinforcement learning policy selects a path that differs from that of the AOI m's plan may be defined as precursor event. Identification of the precursor event may be important since, if the AOI m is notified and the AOI m switches its path accordingly, a safety event is less likely. FIG. 8A depicts the sum of the distance to the policy over time increments t versus the minimum distance to the IA n aircraft over the whole trajectory. FIG. 8B depicts the trajectory set of the original scenario, the model policy, alternative trajectories (e.g., trajectory H), and intruder trajectory of IA n.

The airspace interaction machine learning model found a policy that meets the minimum threshold distance $\theta$, but does not give much more margin than that required to avoid the worst-case LOS scenario. The set of trajectories to the right of the policy in FIG. 8A may also be considered valid for avoiding LOS since they avoid crossing the threshold distance $\theta$. In addition, the airspace interaction machine learning model did not select trajectory H, which does not meet threshold distance $\theta$. The original trajectory of the AOI m may have switched to any of the trajectories to the right of the line for the threshold distance $\theta$ in FIG. 8A, and it could be considered an optimal policy to take actions to take to avoid a LOS event. Therefore, any of the trajectories to the right of the line for the threshold distance $\theta$ in FIG. 8A, could identify precursor events at the time the airspace interaction machine learning model decides the AOI m has to change trajectory from the planned trajectory.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for updating a vehicle interaction machine learning model, the method comprising:
 obtaining trajectory information indicating trajectories of a plurality of vehicles over a set period of time;
 analyzing the trajectory information to determine whether a trajectory, among the trajectories within the set period of time, is a new trajectory type;
 analyzing the trajectory information to determine whether the trajectory is a member of a new interaction, wherein an interaction is a trajectory, among the trajectories within the set period of time, of a first vehicle of the plurality of vehicles within a threshold distance of a trajectory, among the trajectories within the set period of time, of a second vehicle of the plurality of vehicles, and wherein the interaction includes combinations of vehicles that were not operating at the same time, but that would have been within a threshold distance of each other if the respective vehicles had been operating at the same time;

in response to determining the trajectory is a new trajectory type or the trajectory is a member of a new interaction, updating training data for the vehicle interaction machine learning model with the new trajectory type or the new interaction; and training the vehicle interaction machine learning model based on the updated training data including the new trajectory type or the new interaction.

2. The method of claim 1, wherein the analyzing the trajectory information includes:

obtaining trajectory type information indicating a plurality of stored trajectory types;

comparing the trajectory of the trajectory information to a trajectory type of the plurality of stored trajectory types;

in response to a comparison result of the comparing indicating a dissimilarity value more than a threshold dissimilarity value, identifying the trajectory as a potential new trajectory type, the potential new trajectory type being added to the plurality of stored trajectory types; and in response to the comparison result indicating the dissimilarity value being less than or equal to the threshold dissimilarity value, adding the trajectory to a history of one of the plurality of the stored trajectory types.

3. The method of claim 2, further comprising:

in response to the comparing, determining whether any potential new trajectory types of the plurality of stored trajectory types have sufficient history;

in response to one or more potential new trajectory types having a sufficient history, verifying whether the one or more potential new trajectory types are new trajectory types; and in response to at least one new trajectory type being verified, adding the at least one new trajectory type as the new trajectory type to the training data.

4. The method of claim 2, wherein the comparing the trajectory of the trajectory information to the trajectory type includes:

determining a minimum distance between points of the trajectory to points of the trajectory type; and determining the comparison result by assigning the minimum distance as the dissimilarity value.

5. The method of claim 1, wherein the trajectory is a first trajectory, and the analyzing the trajectory information includes:

obtaining trajectory type information indicating a plurality of stored trajectory types;

comparing the first trajectory of the trajectory information to a trajectory type of the plurality of stored trajectory types or comparing the first trajectory to second trajectory of the trajectory information, the first trajectory being for a first vehicle and the second trajectory being for a second vehicle operating at the same time as the first vehicle; and in response to a comparison result of the comparing indicating a value less than a model separation threshold value, determining whether the first trajectory is a member of a new trajectory based on the first trajectory and the trajectory type or the second trajectory.

6. The method of claim 5, wherein the determining whether the first trajectory is a member of a new trajectory includes:

determining whether an interaction of a first trajectory type of the first trajectory and a second trajectory type of the second trajectory or the trajectory type is equivalent to any interactions stored in an interactions database; and in response to determining that the interaction is not equivalent to any interactions stored in the interactions database, adding the interaction to the interactions database.

7. The method of claim 6, wherein the determining whether the interaction is equivalent to any interactions stored in the interactions database includes determining tile spaces for the interaction and the interactions in the interactions database, the tile spaces being a geographic area and/or speed profile associated with a segment of a trajectory for a first interaction aircraft that is closest to a segment of a trajectory of a second interaction aircraft;

determining whether a tile space for the interaction intersects with any of tile spaces for the interactions; and in response to the tile space of the interaction not intersecting with any of the tile spaces for the interactions, determining that the interaction is not equivalent to any interactions stored in the interactions database.

8. A system for updating a vehicle interaction machine learning model, the system comprising:

a memory storing instructions; and a processor executing the instructions to perform a process including:

obtaining trajectory information indicating trajectories of a plurality of vehicles over a set period of time;

analyzing the trajectory information to determine whether a trajectory, among the trajectories within the set period of time, is a new trajectory type;

analyzing the trajectory information to determine whether the trajectory is a member of a new interaction, wherein an interaction is a trajectory, among the trajectories within the set period of time, of a first vehicle of the plurality of vehicles within a threshold distance of a trajectory, among the trajectories within the set period of time, of a second vehicle of the plurality of vehicles, and wherein the interaction includes combinations of vehicles that were not operating at the same time, but that would have been within a threshold distance of each other if the respective vehicles had been operating at the same time;

in response to determining the trajectory is a new trajectory type or the trajectory is a member of a new interaction, updating training data for the vehicle interaction machine learning model with the new trajectory type or the new interaction; and training the vehicle interaction machine learning model based on the updated training data including the new trajectory type or the new interaction.

9. The system of claim 8, wherein the analyzing the trajectory information includes:

obtaining trajectory type information indicating a plurality of stored trajectory types;

comparing the trajectory of the trajectory information to a trajectory type of the plurality of stored trajectory types;

in response to a comparison result of the comparing indicating a dissimilarity value more than a threshold dissimilarity value, identifying the trajectory as a potential new trajectory type, the potential new trajectory type being added to the plurality of stored trajectory types; and in response to the comparison result indicating the dissimilarity value being less than or equal to the threshold dissimilarity value, adding the trajectory to a history of one of the plurality of the stored trajectory types.

10. The system of claim 9, further comprising:
in response to the comparing, determining whether any potential new trajectory types of the plurality of stored trajectory types have sufficient history;
in response to one or more potential new trajectory types having a sufficient history, verifying whether the one or more potential new trajectory types are new trajectory types; and
in response to at least one new trajectory type being verified, adding the at least one new trajectory type as the new trajectory type to the training data.

11. The system of claim 9, wherein the comparing the trajectory of the trajectory information to the trajectory type includes:
determining a minimum distance between points of the trajectory to points of the trajectory type; and
determining the comparison result by assigning the minimum distance as the dissimilarity value.

12. The system of claim 8, wherein the trajectory is a first trajectory, and the analyzing the trajectory information includes:
obtaining trajectory type information indicating a plurality of stored trajectory types;
comparing the first trajectory of the trajectory information to a trajectory type of the plurality of stored trajectory types or comparing the first trajectory to second trajectory of the trajectory information, the first trajectory being for a first vehicle and the second trajectory being for a second vehicle operating at the same time as the first vehicle; and
in response to a comparison result of the comparing indicating a value less than a model separation threshold value, determining whether the first trajectory is a member of a new trajectory based on the first trajectory and the trajectory type or the second trajectory.

13. The system of claim 12, wherein the determining whether the first trajectory is a member of a new trajectory includes:
determining whether an interaction of a first trajectory type of the first trajectory and a second trajectory type of the second trajectory or the trajectory type is equivalent to any interactions stored in an interactions database; and
in response to determining that the interaction is not equivalent to any interactions stored in the interactions database, adding the interaction to the interactions database.

14. The system of claim 13, wherein the determining whether the interaction is equivalent to any interactions stored in the interactions database includes
determining tile spaces for the interaction and the interactions in the interactions database, the tile spaces being a geographic area and/or speed profile associated with a segment of a trajectory for a first interaction aircraft that is closest to a segment of a trajectory of a second interaction aircraft;

determining whether a tile space for the interaction intersects with any of tile spaces for the interactions; and
in response to the tile space of the interaction not intersecting with any of the tile spaces for the interactions, determining that the interaction is not equivalent to any interactions stored in the interactions database.

15. A non-transitory computer-readable medium storing instructions that, when executed by processor, cause the processor to perform a method for updating a vehicle interaction machine learning model, the method comprising:
obtaining trajectory information indicating trajectories of a plurality of vehicles over a set period of time;
analyzing the trajectory information to determine whether a trajectory, among the trajectories within the set period of time, is a new trajectory type;
analyzing the trajectory information to determine whether the trajectory is a member of a new interaction, wherein an interaction is a trajectory, among the trajectories within the set period of time, of a first vehicle of the plurality of vehicles within a threshold distance of a trajectory, among the trajectories within the set period of time, of a second vehicle of the plurality of vehicles, and wherein the interaction includes combinations of vehicles that were not operating at the same time, but that would have been within a threshold distance of each other if the respective vehicles had been operating at the same time;
in response to determining the trajectory is a new trajectory type or the trajectory is a member of a new interaction, updating training data for the vehicle interaction machine learning model with the new trajectory type or the new interaction; and
training the vehicle interaction machine learning model based on the updated training data including the new trajectory type or the new interaction.

16. The non-transitory computer-readable medium of claim 15, wherein the analyzing the trajectory information includes:
obtaining trajectory type information indicating a plurality of stored trajectory types;
comparing the trajectory of the trajectory information to a trajectory type of the plurality of stored trajectory types;
in response to a comparison result of the comparing indicating a dissimilarity value more than a threshold dissimilarity value, identifying the trajectory as a potential new trajectory type, the potential new trajectory type being added to the plurality of stored trajectory types; and
in response to the comparison result indicating the dissimilarity value being less than or equal to the threshold dissimilarity value, adding the trajectory to a history of one of the plurality of the stored trajectory types.

17. The non-transitory computer-readable medium of claim 16, further comprising:
in response to the comparing, determining whether any potential new trajectory types of the plurality of stored trajectory types have sufficient history;
in response to one or more potential new trajectory types having a sufficient history, verifying whether the one or more potential new trajectory types are new trajectory types; and
in response to at least one new trajectory type being verified, adding the at least one new trajectory type as the new trajectory type to the training data.

18. The non-transitory computer-readable medium of claim 15, wherein the trajectory is a first trajectory, and the analyzing the trajectory information includes:

obtaining trajectory type information indicating a plurality of stored trajectory types;

comparing the first trajectory of the trajectory information to a trajectory type of the plurality of stored trajectory types or comparing the first trajectory to second trajectory of the trajectory information, the first trajectory being for a first vehicle and the second trajectory being for a second vehicle operating at the same time as the first vehicle; and in response to a comparison result of the comparing indicating a value less than a model separation threshold value, determining whether the first trajectory is a member of a new trajectory based on the first trajectory and the trajectory type or the second trajectory.

19. The non-transitory computer-readable medium of claim 18, wherein the determining whether the first trajectory is a member of a new trajectory includes:

determining whether an interaction of a first trajectory type of the first trajectory and a second trajectory type of the second trajectory or the trajectory type is equivalent to any interactions stored in an interactions database; and in response to determining that the interaction is not equivalent to any interactions stored in the interactions database, adding the interaction to the interactions database.

20. The non-transitory computer-readable medium of claim 19, wherein the determining whether the interaction is equivalent to any interactions stored in the interactions database includes determining tile spaces for the interaction and the interactions in the interactions database, the tile spaces being a geographic area and/or speed profile associated with a segment of a trajectory for a first interaction aircraft that is closest to a segment of a trajectory of a second interaction aircraft;

determining whether a tile space for the interaction intersects with any of tile spaces for the interactions; and in response to the tile space of the interaction not intersecting with any of the tile spaces for the interactions, determining that the interaction is not equivalent to any interactions stored in the interactions database.

* * * * *